United States Patent
Bruner et al.

(10) Patent No.: US 7,312,982 B2
(45) Date of Patent: Dec. 25, 2007

(54) DIGITAL STORAGE ELEMENT MECHANICAL SHOCK ISOLATION ARRANGEMENT IN A HOST DEVICE AND METHOD

(75) Inventors: Curtis H. Bruner, Longmont, CO (US); John F. Fletcher, Longmont, CO (US); Frida E. Romauli Fletcher, Longmont, CO (US)

(73) Assignee: Benhov GmbH, LLC., Wilmington, DE (US)

( * ) Notice: Subject to any disclaimer, the term of this patent is extended or adjusted under 35 U.S.C. 154(b) by 126 days.

(21) Appl. No.: 11/118,164

(22) Filed: Apr. 28, 2005

(65) Prior Publication Data

US 2005/0185326 A1 Aug. 25, 2005

Related U.S. Application Data

(63) Continuation of application No. 10/777,605, filed on Feb. 11, 2004, now Pat. No. 6,956,738, which is a continuation of application No. 10/103,057, filed on Mar. 20, 2002, now Pat. No. 6,831,830.

(51) Int. Cl.
    *G06F 1/16* (2006.01)
(52) U.S. Cl. ..................................... 361/685
(58) Field of Classification Search ................. 361/685
    See application file for complete search history.

(56) References Cited

U.S. PATENT DOCUMENTS

| | | | |
|---|---|---|---|
| 4,980,786 A | 12/1990 | O'Sullivan et al. | |
| 5,030,260 A * | 7/1991 | Beck et al. | ................. 96/139 |
| 5,051,868 A | 9/1991 | Leverault et al. | |
| 5,587,854 A | 12/1996 | Sato et al. | |
| 5,677,813 A * | 10/1997 | Yoshida et al. | .......... 360/97.02 |
| 5,680,293 A | 10/1997 | McAnally et al. | |
| 5,706,168 A | 1/1998 | Erler et al. | |
| 5,760,998 A | 6/1998 | Berberich et al. | |
| 5,793,566 A | 8/1998 | Scura et al. | |
| 6,015,196 A | 1/2000 | Welsh et al. | |
| 6,304,440 B1 | 10/2001 | Lin | |
| 6,308,961 B1 | 10/2001 | Kunikane et al. | |
| 6,445,587 B1 | 9/2002 | Pavol | |
| 2001/0012175 A1 | 8/2001 | Williams et al. | |
| 2002/0043608 A1 | 4/2002 | Nakata et al. | |
| 2003/0015639 A1 | 1/2003 | Smith | |

OTHER PUBLICATIONS

R. W. Clough et al, Dynamics of Structures, Jan. 1975, McGraw Hill, pp. 87-96.

* cited by examiner

*Primary Examiner*—Lisa Lea-Edmonds
(74) *Attorney, Agent, or Firm*—Workman Nydegger

(57) ABSTRACT

A digital storage arrangement is interfaceable with a host device which defines a cavity. The digital storage arrangement includes a housing receivable in the cavity, with a movement margin between the housing and host device, while a resilient support arrangement is provided for fixed engagement with the host device and for engaging the housing, while extending through the movement margin, to support the housing within the storage device cavity and to subject the storage device to a lesser degree of mechanical shock when the host device receives a given mechanical shock. The resilient support arrangement provides support by extending from each corner region of the housing to the host device. The support arrangement is molded through an opening defined by the housing in each corner region to extend outwardly to the host device. A bumper configuration is provided integral with the support arrangement and including a sealing arrangement.

51 Claims, 10 Drawing Sheets

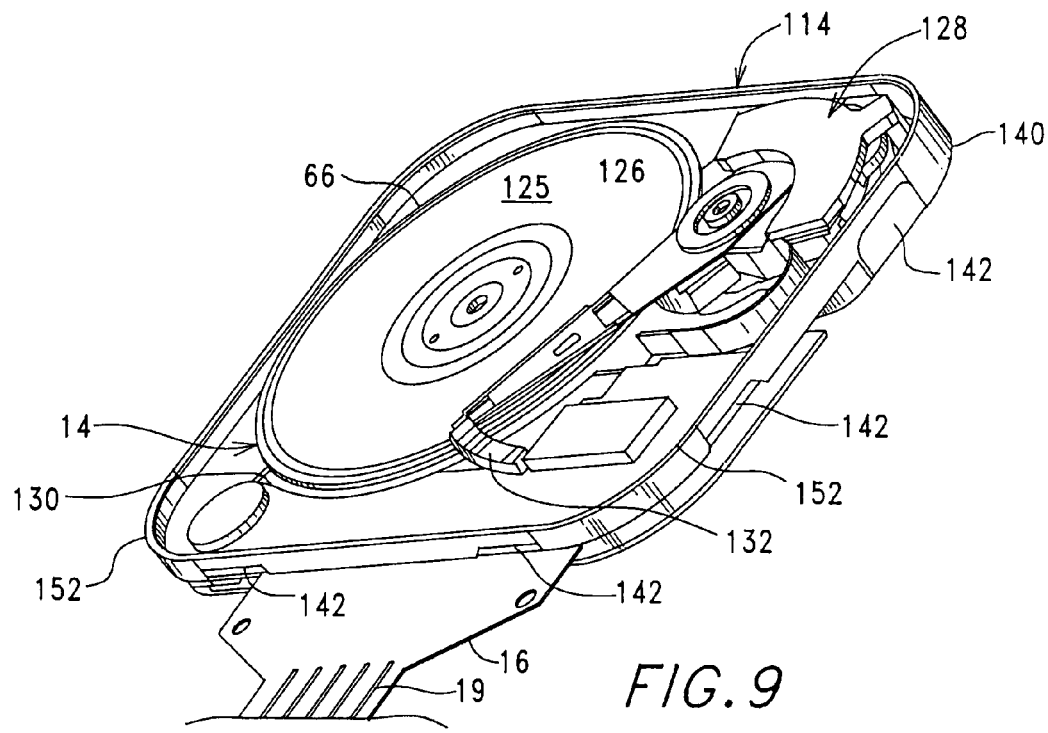
FIG. 9
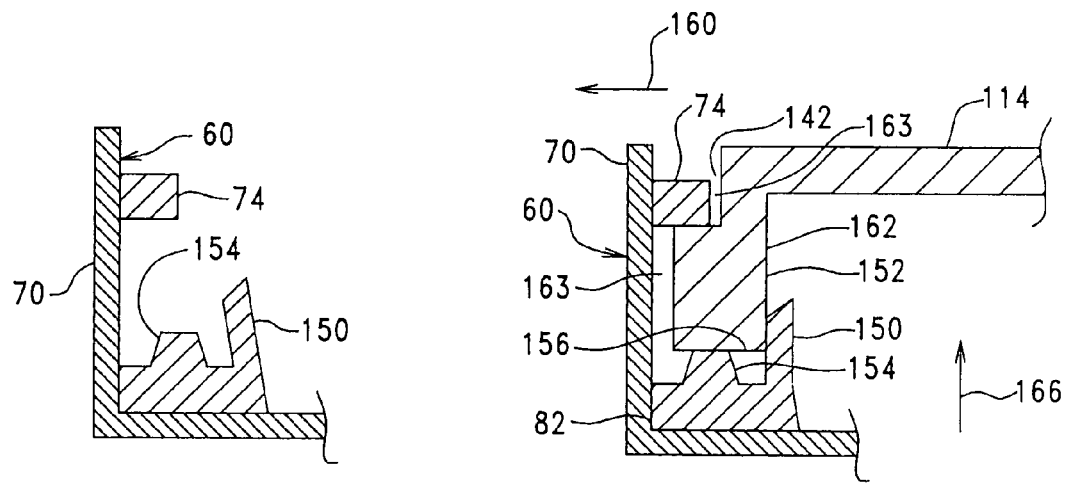
FIG. 10
FIG. 11

DIGITAL STORAGE ELEMENT MECHANICAL SHOCK ISOLATION ARRANGEMENT IN A HOST DEVICE AND METHOD

The present application is a continuation of U.S. patent application Ser. No. 10/777,605 filed on Feb. 11, 2004; now U.S. Pat. No. 6,956,738 which is a continuation of U.S. patent application Ser. No. 10/103,057 filed on Mar. 20, 2002 and now issued as U.S. Pat. No. 6,831,830 B2 on Dec. 14, 2004; which are incorporated herein by reference in their entirety.

BACKGROUND OF THE INVENTION

The present invention relates generally to the field of arrangements for supporting Digital Storage Elements or other such devices which are sensitive to mechanical shock and, more particularly, to a highly advantageous resilient support arrangement for isolating a Digital Storage Element from the effects of a given mechanical shock. The present invention provides additional advantages beyond mechanical shock isolation, as will be described.

As a class of devices, electromechanical digital storage arrangements are generally susceptible to mechanical shock. Hard disk drives are especially susceptible to mechanical shock during operation. In fact, upon the receipt of an electromechanical shock having a sufficient magnitude and frequency, it is well known that a hard disk drive may experience a catastrophic failure. The prior art, in coping with the potential effects of mechanical shock, has developed a number of approaches, as will be described below.

As a first example of a prior art approach which attempts to mitigate the effects of mechanical shock on a hard disk drive, rubber grommets or "doughnuts" are used in mounting arrangements. A first implementation of this approach is illustrated by FIG. 12 of U.S. Pat. No. 5,706,168, issued to Erler et al (hereinafter the '168 patent), as well as an associated description which appears at column 11, lines 15-25. A grommet or rubber doughnut is described as having a receiving groove formed on its outer periphery. The grommet further defines a central fastener receiving hole. The peripheral receiving groove is used to capture each grommet within an aperture that is itself defined within a mounting bridge. The latter, in turn, supports a hard disk drive. A threaded fastener passes through the fastener receiving hole defined by the grommet and threadingly engages a boss. Accordingly, the mounting bridge is resiliently isolated by a plurality of rubber grommets so as to, in turn, isolate the hard disk drive.

One typical and relatively simplistic implementation of the rubber grommet approach (not illustrated) does not rely on the use of a mounting bridge. Four mounting posts are threaded directly into the hard disk drive. A rubber grommet is then received on the mounting post. The host device then captures each rubber grommet about its peripheral groove, thereby providing for at least limited shock isolation.

Either implementation of the rubber grommet isolation approach is at least somewhat effective in providing mechanical shock isolation, however, it should be appreciated that a number of problems accompany its use. For example, this approach may be considered as an anisotropic mounting arrangement. That is, shock attenuation properties vary with directional orientation. In particular, the shock attenuation properties in a direction oriented along the elongation axis of the mounting post are generally completely different from the isolation properties in a plane that is transverse to the mounting post and which bisects the rubber doughnut. For a force oriented along the elongation axis, the rubber doughnut is subjected to compression, extending uniformly about the circumference of the rubber doughnut. For all other force orientations, the rubber doughnut experiences at least some radial compression of only a portion of its circumference. Where a received force is orthogonal to a mounting post, the rubber doughnut experiences only partial radial compression. Hence, with variation of the orientation of received forces, an extremely complex multi-mode response interaction is exhibited by the rubber doughnuts ranging along a spectrum from uniform circumferential compression to partial radial compression or some combination thereof. It is submitted that it is extremely difficult to control shock isolation properties with respect to these different responses, for example, with the intent of providing equal attenuation properties in every direction. The present invention considers the rubber doughnut approach as being unacceptable in the instance where precision control of mechanical shock response is required, as will be further described at an appropriate point hereinafter.

Another approach taken by the prior art in dealing with mechanical shock is represented by U.S. Pat. No. 6,304,440 issued to Lin (hereinafter the '440 patent). The '440 patent further describes an external box for a hard disk drive that is electrically interfaceable with a host computer, rather than a support arrangement for physically receiving a storage component within a host device. The patent, however, describes a padded arrangement for housing the hard disk drive, as may be seen in its FIGS. 1 and 2 wherein a plurality of soft protecting pads 5, each of which includes a cylindrical configuration, apparently support the hard disk drive within the external hard disk drive housing. A number of the protecting pads are mounted outward of a pair of fixing blocks which are themselves affixed along three edges of the hard disk drive. The brief description within the patent appears to be devoid of any further description as to how the remaining protecting pads are attached or held in place, if indeed, they are attached in place at all. Moreover, no description has been found by Applicants which would lead Applicants to believe that the outward or free ends of any of the support pads are fixedly attached to the interior surfaces of the external case in any way. While it is admitted that cushioning is provided by the support arrangement of the '440 patent, at the same time, it is submitted that the approach of this patent is problematic for a number of reasons, as will be described immediately hereinafter.

Initially, it is submitted that the patent is devoid of any description with regard to implementing the mechanical shock protection scheme in view of a given mechanical shock force that is anticipated to be received by the external hard disk drive case. In this regard, it should be appreciated that the response of any support arrangement varies not only with the magnitude of the mechanical shock received and its directional orientation, but also with the frequency of the received shock. Still further complications are introduced since there is no description as to how many of the soft pads should be used at each surface of the hard disk drive, how the pads should be arranged or how to keep them in that arrangement. Further, no description is provided as to the material from which the soft pads are formed or for appropriately selecting suitable materials. In and by themselves, these complications create significant concerns with regard to implementing a precision shock protection arrangement.

With continuing reference to the '440 patent, the response of this arrangement is still further complicated by the outward, unconnected or free ends of the cylindrical shock pads. Since the free end of each pad is apparently intended to be held in position only by a resilient bias force afforded by the pad itself compressed between the hard disk drive and external case, maintaining any position of the free end of each pad is dependent upon the magnitude of the resilient bias force, as well as friction between the free end of the pad and the interior of the external case. When a shock of a sufficient magnitude and frequency is received, it is submitted that the free ends of the pads will slip against the external case. Upon slipping in this manner, it is uncertain whether the pads will return to their original positions. Once the free ends of the pads are randomly displaced in such a way, any predictability as to the response of this arrangement to a given mechanical shock is certainly lost. Over time, the position of the hard disk drive may shift within the external hard drive case with shifting of the free ends of the soft pads in one direction or another. Of course, further unpredictability will be encountered where the pads permanently deform into curved configurations as a result of long-term free end displacement.

Like the '168 patent, described above, providing a controlled or equal response along or about different axes is considered, at the least, to be difficult using this arrangement. For example, the soft pads must respond in different ways depending upon the directional orientation of a received mechanical force. Where the latter is normal to one of the padded sides of the hard disk drive, those pads will compressively receive the force. In contrast, a mechanical force having a component directed across diagonally opposing corners of the hard disk drive will cause bending of the pads. That is, none of the pads in the entire arrangement are solely compressed by such a diagonally oriented mechanical shock force. Thus, the pads may respond in a complex multimode manner depending upon the directional orientation of a received force. This complexity is itself problematic where it is desired to implement a precision controlled shock response arrangement.

Still another prior art approach to the problem of dealing with mechanical shock forces received by a digital storage arrangement is exemplified by published U.S. patent application No. 2001/0012175, by Williams et al., published on Aug. 9, 2001 (hereinafter Williams). The Williams publication describes a hard disk drive to which a plurality of elastomeric bumpers is attached. Each bumper includes a shank that is pressed into an aperture defined by the hard disk drive. The utility of these bumpers is described in the context of dropping the hard disk drive onto an external surface during shipment so as to produce an impact load directly received by the hard disk drive. In this regard, it should be appreciated that the Williams disclosure does not show nor describe a bumper configuration for in situ or operational use, for example, within a host device. Moreover, the Williams disclosure appears to provide no description with regard to specific design considerations in view of the hard disk drive receiving a given mechanical shock, for instance, directly onto one of the described bumpers.

It is submitted that the present invention resolves the foregoing complications, problems and concerns in highly advantageous ways while providing still further advantages.

SUMMARY OF THE INVENTION

As will be described in more detail hereinafter, there is disclosed herein a digital storage arrangement with a support arrangement for use in a host device and method. The digital storage arrangement and host device, in combination, form an electronic assembly.

In one aspect of the present invention, a digital storage arrangement is electrically interfaceable with a host device which defines a storage device cavity. The digital storage arrangement includes a housing receivable in the storage device cavity in a way which provides a movement margin between the housing and the host device. Digital storage means, susceptible to a given mechanical shock, at least to a limited extent, is located within the housing. A flexible electrical interconnection arrangement is included for providing electrical communication between the digital storage means and the host device across the movement margin while a resilient support arrangement is provided for fixed engagement with the host device and for engaging the housing, while extending through the movement margin, to support the housing within the storage device cavity in a way which subjects the digital storage means to a lesser degree of mechanical shock when the host device receives the given mechanical shock. In one feature, the housing includes a peripheral sidewall which defines a plurality of corner regions and the resilient support arrangement provides support by extending from each corner region to the host device. In another feature, the support arrangement is molded through an opening defined by the housing in each corner region to extend outwardly to the host device. In still another feature, a portion of the resilient support arrangement extends from within the peripheral sidewall to form a bumper configuration that moves with the housing such that the bumper configuration comes into contact with the host device prior to direct contact between the housing and the host device with movement of the housing relative to the host device. In yet another feature, the support members and the movement margin are cooperatively configured for permitting mechanically induced movement of the housing relative to the host device in six degrees of freedom to provide a controlled response for each one of six degrees of freedom. In a related feature, movement is constrained so that contact between the housing and the host device is avoided for the given shock force.

In another aspect of the present invention, a digital storage arrangement is interfaceable with a host device. The digital storage arrangement includes housing including a cover portion and a base portion selectively attachable with one another. At least the cover portion is formed from a sheet material which defines a plurality of through-holes and which includes an outer surface. Digital storage means is provided for location within the housing. A resilient arrangement includes a gasket portion that is integrally formed therewith for use in sealing attached ones of the cover portion and the base portion to one another to seal the digital storage means within the housing. The resilient arrangement extends through each through-hole outwardly from the outer surface to form a resilient bumper outward of each through-hole so as to provide a plurality of resilient bumpers. A flexible electrical interface arrangement electrically connects the storage device and the digital storage means through the housing and a support arrangement supports the housing within the host device.

In still another aspect of the present invention, a digital storage arrangement is interfaceable with a host device. The digital storage arrangement includes a housing including a cover portion and a base portion that are selectively attachable with one another using a latching arrangement forming part of the cover portion and part of the base portion. Digital storage means is provided for location within the housing. A sealing arrangement is used for sealing the digital storage means within the housing between attached ones of the base portion and cover portion. A flexible electrical interface arrangement is configured for providing electrical communication between the storage device and the digital storage means through the housing. A support arrangement supports the housing within the host device. In one feature, the cover portion is formed from a sheet material and the latching arms are stamped as an integral portion of the sheet material.

In yet another aspect of the present invention, a resilient arrangement is configured for use in a digital storage arrangement, including digital storage means that is electrically interfaceable with a host device and that is susceptible to a given mechanical shock. The digital storage arrangement includes a housing having a base portion and a cover portion that are selectively attachable with one another, while the host device defines a storage device cavity. The resilient arrangement includes a gasket portion that is integrally formed to seal attached ones of the cover portion and the base portion to one another for sealing the digital storage means within the housing. A support portion, that is integrally formed as part of the resilient arrangement, extends outwardly from the housing, and is configured for engagement with the host device to support the housing within the storage device cavity in a way which subjects the digital storage means to a lesser degree of mechanical shock when the host device receives the given mechanical shock.

In a further aspect of the present invention, a method is described for producing a resilient arrangement for use in a digital storage arrangement including digital storage means that is electrically interfaceable with a host device and that is susceptible to a given mechanical shock. The digital storage arrangement includes a housing having a base portion an a cover portion that are selectively attachable with one another while the host device defines a storage device cavity. The method includes the step of integrally forming the resilient arrangement to include (i) a gasket portion for sealing attached ones of the cover portion and the base portion to one another thereby sealing the digital storage means within the housing and (ii) a support portion for extending outwardly from the housing and configured for engagement with the host device to support the housing within the storage device cavity in a way which subjects the digital storage means to a lesser degree of mechanical shock when the host device receives the given mechanical shock.

In a continuing aspect of the present invention, a resilient arrangement is disclosed for use in a digital storage arrangement including digital storage means. The digital storage arrangement includes a housing having a base portion and a cover portion, each having outer surfaces, such that the base and cover portions are selectively attachable with one another. The resilient arrangement includes a gasket portion for use in sealing attached ones of the cover portion and the base portion to one another thereby sealing the digital storage means within the housing. A bumper portion is included that is integrally formed along with the gasket portion and that extends outwardly at least beyond one of the outer surfaces to form a plurality of resilient bumpers.

In another aspect of the present invention, a resilient arrangement is described for use in a digital storage arrangement which itself includes digital storage means. The digital storage arrangement further includes a housing having a base portion and a cover portion such that the base and cover portions are selectively attachable with one another. The resilient arrangement includes a sealing portion received in one of the base portion and the cover portion and is configured for engaging the other one of the base portion and the cover portion to seal the digital storage means within the housing. A biasing portion forms another part of the resilient arrangement, separate from the sealing portion, but formed integrally therewith, for resiliently biasing engaged ones of the cover and base portion away from one another.

In still another aspect of the present invention, a digital storage configuration includes a housing including a cover portion and a base portion configured for cooperatively defining a housing cavity. Digital storage means is supported within the housing cavity. A recirculation filter is provided for filtering air within the housing cavity. An arrangement is used that is integrally formed from a resilient material (i) for sealing the cover portion against the base portion and (ii) for at least partially supporting the recirculation filter within the housing cavity. In one feature, the arrangement further serves to define, at least partially, a filter passage for directing air through the recirculation filter.

In yet another aspect of the present invention, a digital storage arrangement is electrically interfaceable with a host device. The digital storage arrangement includes digital storage means that is susceptible to a mechanical shock, at least to a limited extent. A base arrangement supports the digital storage means. A cover arrangement is attached to the base arrangement for housing the digital storage means within a cavity that is cooperatively defined by attached ones of the base arrangement and the cover arrangement in a way which permits movement of the base arrangement relative to the cover arrangement and the cover arrangement is configured for engagement by the host device such that the base arrangement, and digital storage means supported thereby, are at least partially isolated from mechanical shock received by the host device by movement of the base arrangement relative to the cover arrangement. In one feature, a resilient arrangement having a damping portion is positioned between the base arrangement and the cover arrangement such that a sufficient amount of relative movement between the base arrangement and the cover arrangement compresses the damping portion to isolate the base arrangement and digital storage means supported thereby from the mechanical shock.

In a continuing aspect of the present invention, a digital storage arrangement, which is electrically interfaceable with a host device and which includes digital storage means that is susceptible to a mechanical shock, at least to a limited extent, is produced by supporting the digital storage means using a base arrangement; attaching the base arrangement to a cover arrangement to position the digital storage means within a cavity that is cooperatively defined by the attached base arrangement and cover arrangement in a way which permits movement of the base arrangement relative to the cover arrangement; and configuring the cover arrangement for engaging the host device such that the base arrangement and the digital storage means supported thereby are at least partially isolated from the mechanical shock received by the host device by movement of the base arrangement relative to the cover arrangement.

BRIEF DESCRIPTION OF THE DRAWINGS

The present invention may be understood by reference to the following detailed description taken in conjunction with the drawings briefly described below.

FIG. 9 is a diagrammatic view, in perspective, of the base portion of the Digital Storage Element, shown here to illustrate details with regard to the components that are supported by the base portion and to illustrate the configuration of a peripheral sealing rim and associated latching member recesses for use in attaching the base portion to the cover portion.

FIG. 10 is a diagrammatic, enlarged cross-sectional view of a peripheral corner region of the cover portion, taken along a line 10-10 in FIG. 7, shown here to illustrate details of a gasket portion of the resilient arrangement, including a peripheral sealing collar or lip and a resilient biasing pedestal that is shown having a conical configuration. A latching member is further illustrated for purposes of engaging one of the latching recesses shown in FIG. 9.

FIG. 11 is a diagrammatic, enlarged cross-sectional view of the corner region of the cover portion, as shown in FIG. 10 and further illustrating engagement of the base portion with the cover portion, showing cooperation between the latching member and latching recess as well as the functionality of the biasing pedestal which operates independently of the peripheral sealing collar.

DETAILED DESCRIPTION OF THE INVENTION

Figure 1:
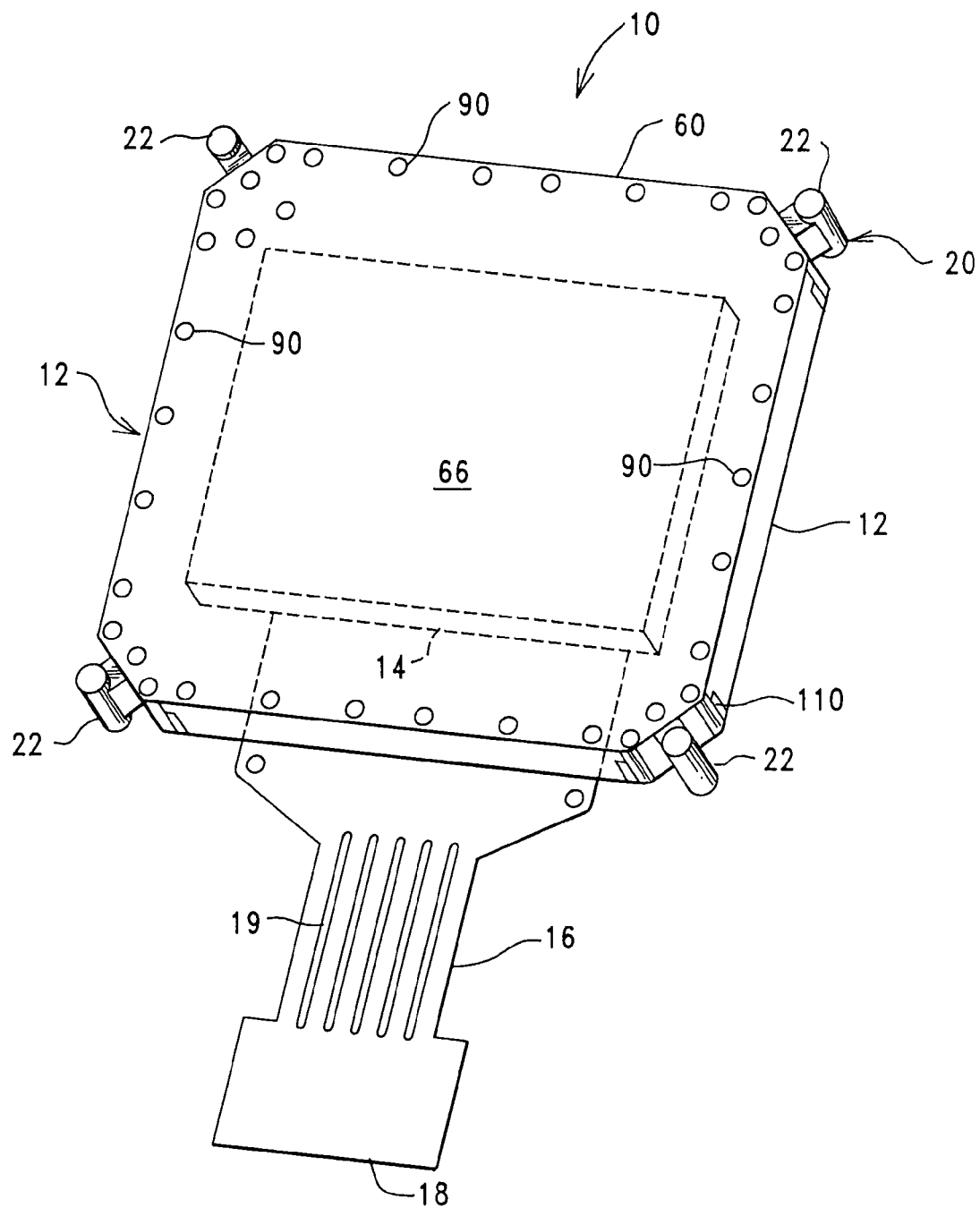
FIG. 1 is a diagrammatic view, in perspective, of the Digital Storage Element of the present invention, shown here to illustrate details of its construction including a highly advantageous resilient support arrangement and integral bumper arrangement.
Figure 2:
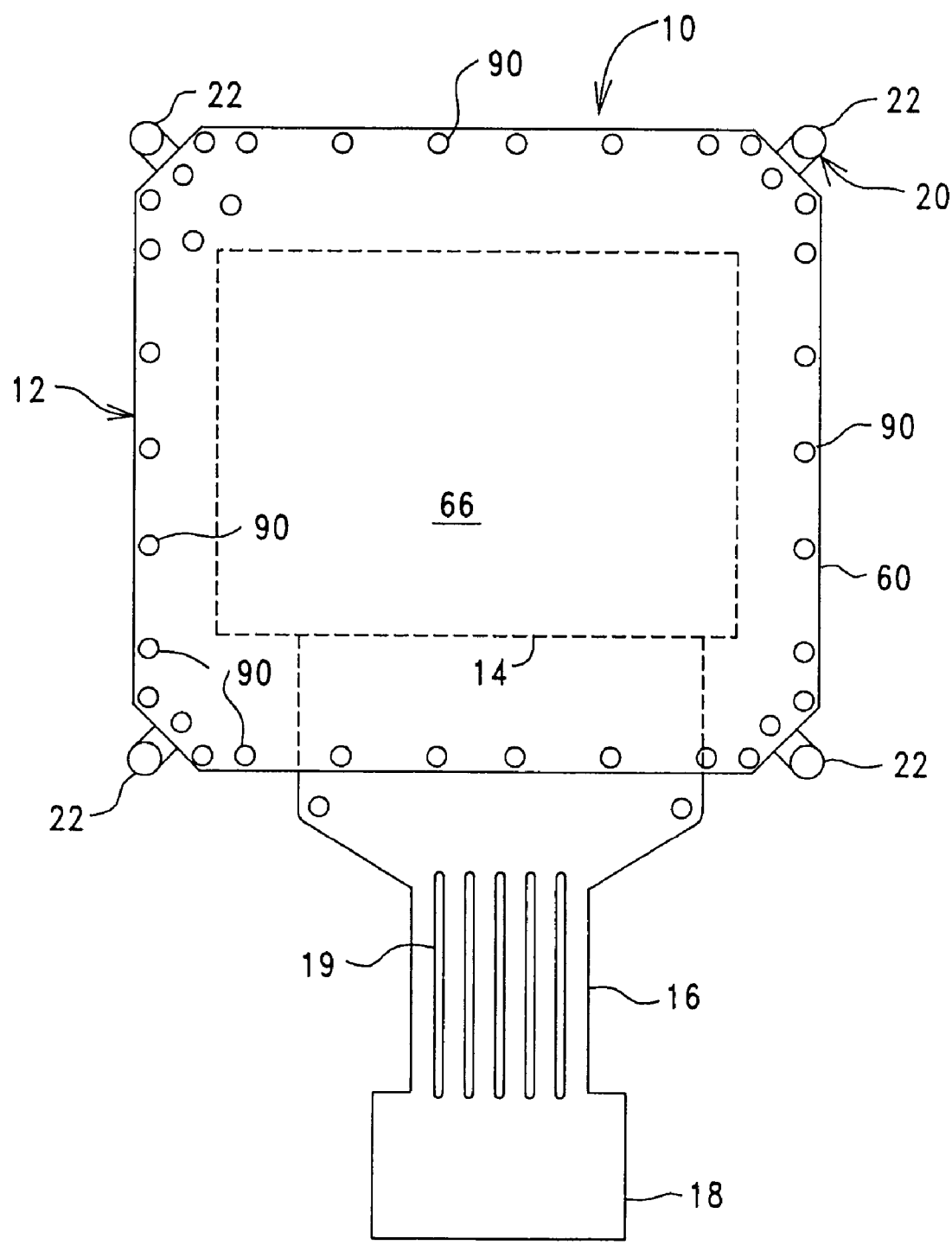
FIG. 2 is a plan view of the Digital Storage Element of FIG. 1, shown here to illustrate further details of its structure.

Turning now to the figures wherein like components are designated by like reference numbers throughout the various figures, attention is immediately directed to FIGS. 1 and 2 which illustrate a Digital Storage Element produced in accordance with the present invention and generally indicated by the reference numeral 10. Digital Storage Element 10 includes a housing 12, a digital storage device 14 and a flexible electrical interface connector 16 having a connection end 18 for electrically connecting digital storage device 14 with a host device to be described in further detail hereinafter. It is noted that electrical interface connector 16 includes features which enhance its flexibility with relative movement of the Digital Storage Element in any potential direction. In the present example, a plurality of elongated slots 19 are provided for this purpose.

Still referring to FIGS. 1 and 2, digital storage device 14 is diagrammatically illustrated and may comprise any suitable form of storage which is susceptible to mechanical shock such as, for example, hard disk drives, electro-optical drives or any other form of such device yet to be developed. The present invention is particularly useful with regard to hard disk drives since such drives are particularly susceptible to mechanical shock, especially during data access operations. It should be appreciated that Digital Storage Element 10 is configured for use within a host device which defines a cavity for receiving the Digital Storage Element. The latter includes a resilient arrangement 20 having a plurality of support arms 22 that extend outwardly from each corner of the digital storage arrangement. While a housing having four corners is illustrated, it should be appreciated that any suitable form may used for the housing and that corners are not a requirement. In this particular example, the corner regions are beveled for the purpose of providing sufficient volume in which to contain the support arms while, at the same time, maintaining a relatively small surrounding clearance or movement margin between the Digital Storage Element and the host device. Any housing may be configured in this manner so as to accommodate the support arms. The illustrated support arms, which may also be referred to as shock mounts, are best seen in the perspective view of FIG. 1 and are specifically configured to engage a host device in a way which resiliently supports the Digital Storage Element within the host device, as will be described in further detail at appropriate points hereinafter.

Figure 3:
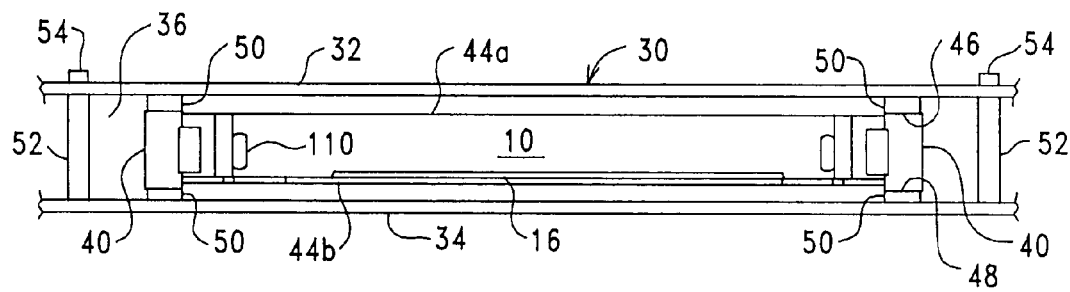
FIG. 3 is an elevational view of the Digital Storage Element of FIGS. 1 and 2, shown installed within a host device to illustrate details of the installation including the manner in which the resilient support arrangement engages the host device.
Figure 4:
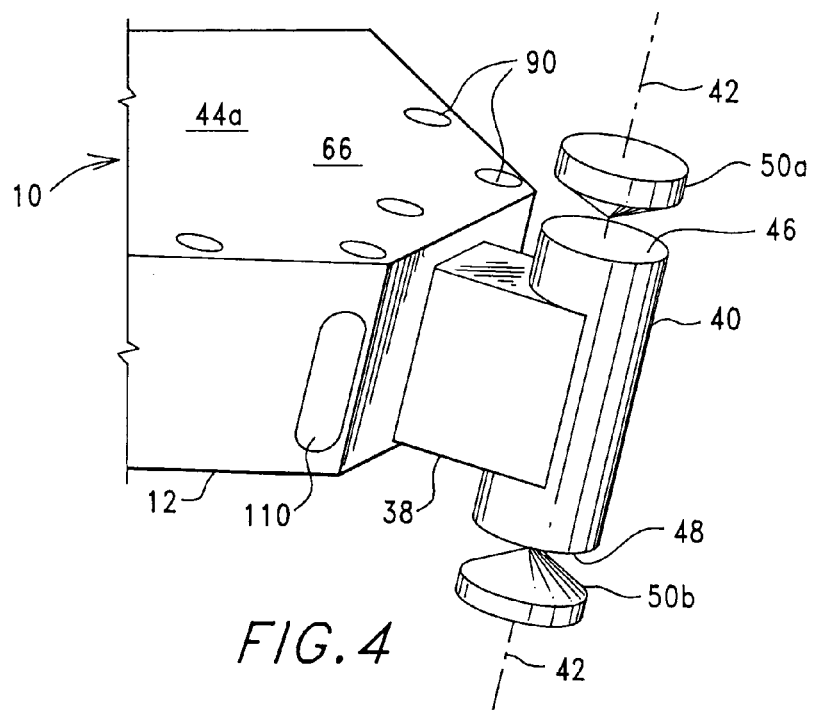
FIG. 4 is an enlarged, perspective view of one corner of the Digital Storage Element of the present invention, shown here to illustrate details of one of the resilient support arms or shock mounts, forming part of the resilient support arrangement, and showing further details with regard to the manner in which the support arm is engaged by the host device.

Turning now to FIGS. 3 and 4 in conjunction with FIGS. 1 and 2, a host device is diagrammatically illustrated and indicated by the reference number 30. Referring specifically to FIG. 3, host device 30 includes a pair of opposing walls 32 and 34 which define a storage device receiving cavity 36 therebetween that is configured for housing Digital Storage Element 10. FIG. 4 is an enlarged partial view of one corner of Digital Storage Element 10 which illustrates details of the configuration of one of support arms 22. Each support arm includes an outwardly extending beam portion 38 having a rectangular cross-section. Beam portion 38 extends to a support column 40, which is cylindrical in configuration, and is integrally formed with beam portion 38. Each support column defines an elongation axis 42 that is generally normal to upper and lower major surfaces 44a and 44b, respectively, of Digital Storage Element 10 at least when the support arm is in a relaxed state. Each support arm defines a pair of opposing, upper and lower support surfaces that are indicated by the reference numbers 46 and 48, respectively. It is noted that the terms "upper" and "lower" are used throughout this disclosure for descriptive purposes only and are in no way intended to be limiting. In the present example, support surfaces 46 and 48 include a convex, cupped, inverse-conical or self-centering configuration; any functionally equivalent shape is considered as interchangeable in this capacity. Moreover, surfaces 46 and 48 may be pierced for retention purposes or retained in any other suitable manner. As will be seen, Digital Storage Element 10 may be supported in a resilient manner by biasing these opposing support surfaces toward one another so as to compress support column 40 therebetween. It is to be understood that the configuration of the support arms may be modified in any suitable manner and that such modifications are considered as being within the scope of the appended claims so long as the teachings herein are applied. For example, the specific, illustrated and described geometric shapes such as the cylindrical form of support column 40 and the rectangular form of beam 38 are shown for descriptive purposes only and are not required. Suitable materials from which the support arms may be formed include, but are not limited to a thermoplastic elastomer and a thermosetting elastomer such as, for example, rubber and fluorocarbon elastomer. Any suitable material yet to be developed may also be utilized in view of this description. Generally, the support arms are formed by the process of molding including those currently known molding processes such as, for example, injection molding and pot transfer molding. Any suitable molding process that is yet to be developed is likewise applicable. Specific details with regard to design considerations in the implementation of the support arms will also be set forth below.

Referring to FIGS. 3 and 4, column ends 40 of the support arms cooperate with the host device to resiliently support Digital Storage Element 10 in a highly advantageous way. Specifically, with reference to FIG. 3, upper opposing wall 32, as well as lower opposing wall 34 of host device 30 each support a set of four mounting posts or pedestals 50 that are configured to engage opposing upper and lower support surfaces 46 and 48 of column ends 40 of the support arms. FIG. 4 is a partial perspective view of one corner of Digital Storage Element 10 showing details of one of support arms 22 and an opposing pair of mounting pedestals that are indicated by the reference numbers 50a and 50b and which are moveable towards one another to engage the support column of the illustrated support arm. In this regard, the upper and lower sets of mounting pedestals supported by upper opposing wall 32 and lower opposing wall 34, respectively, are themselves supported in a manner which provides for installation of the Digital Storage Element between the opposing sets of mounting pedestals. For example, the housing of a host device may include one of opposing walls 32 or 34 as part of its external case having one set of mounting pedestals attached thereto. The other one of the opposing walls may be provided in the form of a mounting plate which itself supports the other set of mounting pedestals. Further, a set of threaded bosses 52 may also be mounted onto, for example, lower opposing wall 34. These bosses include a length which provides a selected separation distance between the opposing sets of mounting pedestals so as to compress support column 40 of each support arm by an appropriate amount in an installed condition. Installation of the Storage Element is accomplished by positioning the support arms onto the lower set of pedestals 50 and then positioning the upper set of mounting pedestals onto the support arms using a mounting plate serving as upper opposing wall 32. Mounting pedestals 50 include a conical, self-centering end configuration, seen in FIG. 4, for engaging the support surfaces of shock mount column 40. Thereafter, a set of fasteners 54 may be used to threadingly engage the bosses so as to affix the mounting plate thereto. As the fasteners engage the bosses, column ends 40 of the support arms are compressed and thereby captured between opposing ones of the mounting pedestals, as illustrated in FIG. 3. As will be appreciated, the self-centering support configuration at the ends of support columns 40 of the shock mount arms cooperate with the self-centering configuration of mounting pedestals 50 to retain the column ends of the support arms at least over a contemplated range of mechanical shock force.

Having described the structure of the Digital Storage Element of the present invention, including its integral resilient support arrangement, it is now appropriate to discuss design details which are of importance with regard to mechanical shock attenuation. For an impulse of very short duration (i.e. a mechanical shock of high frequency), a significant portion of the applied load or input mechanical shock is resisted by the inertia and the stiffness of the Storage Element. The shock response is not governed by the shock amplitude only. The shock input duration or frequency plays an important role in the structure response and will be explained below.

Damping is of considerably less importance in controlling the maximum response of a structure to impulsive (shock) loads while it is of more importance for periodic and harmonic loads such as, for example, vibrations. Stated in a slightly different way, the maximum response to an impulsive load is reached in a very short time, before the damping forces can absorb significant energy from the structure. In contrast, during non-shock vibration, system damping properties merit relatively careful consideration.

Shock attenuation, as well as amplification, depends on a ratio between the frequency of the input shock and a natural frequency of the system. Over a certain range of this frequency ratio, shock movement amplitude of the Digital Storage Element is attenuated, while outside this range, the shock movement amplitude may be amplified or unattenuated. Therefore, for a given range of shock frequencies, the resilient support system of the present invention may be designed such that the ratio between the system natural frequency and the shock frequency is within the attenuation range. With regard to vibration, it should be noted that the vibration transmissibility is a function of a ratio between the vibration frequency and the resilient support system's natural frequency.

The natural frequency of the resilient support system depends not only on its mass but also on its stiffness (or flexibility). The stiffness (or flexibility) of the system depends on a number of factors including its resilient support geometry and its resilient support material properties such as, for example, Young's moduli (generally referred to as "moduli" or "modulus") and densities of various components.

In accordance with the present invention, the Digital Storage Element is resiliently suspended within the host device, and connected thereto by attachments in the form of its support arms. In doing so, the flexibility or stiffness of the resilient support system is mainly governed by the geometry, size, and modulus of the support arms. In this way, the natural frequencies of the system may be manipulated by changing the support arm geometry and/or its component material without affecting the general internal configuration of the digital storage device itself. It should be appreciated that the support arms are under mechanical stress even when the host device is in a static state under the influence of gravity. Upon the receipt of a mechanical shock by the host device, movement of the Digital Storage Element relative to the host device places dynamic mechanical stress on the resilient support arms.

With regard to the resilient support arrangement, it should be appreciated that the energy absorbed by each component part of the system during a mechanical shock event is proportional to the deformation and/or displacement of that individual part. In providing flexible support arm attachments, these latter elements deform to permit the Digital Storage Element to move or deflect in all six degrees of freedom within the confines of the host device. In view of the teachings herein, the resilient support arm arrangement may be designed to provide a controlled response to a given shock force within a given movement margin around the Digital Storage Element with respect to three orthogonally arranged axes (i.e., x,y,z) such that movement of the Digital Storage Element does not exceed constraints that are imposed by the available movement margin in six degrees of freedom. That is, movement of the Digital Storage Element is constrained so as to avoid contacting the host device for the given force because the support members and the movement margin are cooperatively configured for permitting mechanically induced movement of the housing relative to the host device in six degrees of freedom, thereby providing a predetermined or controlled degree of attenuation for each one of the six degrees of freedom. In this regard, it should be appreciated that mechanical forces will generally induce components of movement in all six degrees of freedom. Because the Digital Storage Element is stiff in comparison to the support arms, movement of the Digital Storage Element may be characterized, at least initially, as rigid body motion. During shock induced movement, a major portion of input energy is absorbed by the attachment deformation of the support arms accompanied by rigid body motion components of the Storage Element. A lesser degree of input energy is therefore transferred to the components within the Digital Storage Element (i.e. the digital storage device housed therein). If the support arm attachments are made more stiff, the internal components of the Digital Storage Element experience correspondingly greater levels of transferred shock.

Further considering materials for use in forming the shock mounts of the present invention, it is to be understood that changes in the response of candidate materials with temperature is of substantial importance and may be the most limiting factor. Stated in a slightly different way, changes in the properties of interest (shock response as well as vibration damping) are generally most dynamic against changes in temperature. Of course, any number of additional factors should be considered such as, for example, the influence of aging on the properties of interest.

With regard to specific design techniques used in the implementation of the resilient support arrangement of the Digital Storage Element, it should be appreciated that, due to the relative complexity and the high non-linearity of the problem, Finite Element methods are typically used in an overall iterative process. Specifically, a simplified model is initially developed wherein the host device and the Digital Storage Element include rigid or stiff surfaces which may be modeled with beams and/or shell elements. The Digital Storage Element is contained within the cavity defined inside the host, and connected to the host at the corner regions using flexible attachments (i.e., representing the support arms).

The flexible corner attachments may, at least initially, be modeled using beam elements including a sufficient the number of elements so as to represent several mode shapes seen in the bending and deformation of the flexible support arms. It is noted that, in this problem, one reason for positioning the support arms at the corner regions resides in maintaining a high level of control over movement of the Digital Storage Element with respect to the host device since the movement margin between these two bodies is intended to be very small, for example, on the order of 0.5 mm surrounding the Digital Storage Element. Where the space between the two bodies is relatively larger, the support arms are more readily positioned away from the corner regions. Of course, having accomplished an initial analysis, further iterations may be directed to support arrangements that are not specifically attached at the corner regions. For example, support members are contemplated in the form of elastic webs which may be attached along the lengthwise edges of the Digital Storage Element for additional connection to the host device. All of these modifications are considered to be within the scope of the present invention so long as resilient support is accomplished through the application of the teachings herein.

As part of this analysis, a maximum static deflection of the support arms is determined including the influence of the weight of the Storage Element. The host device is considered as being in a static condition. The maximum static deflection must be less than or equal to the allowable deflection, as defined by the cavity in which the Digital Storage Element is received. That is, the allowable deflection is equal to or less than the space between the host device and the Digital Storage Element on any one side of the Digital Storage Element. A low modulus material should be selected for use in forming the shock mounts. The selected material should also include an acceptable damping property for purposes of vibration damping. If the maximum static deflection exceeds the allowable deflection, the support arm stiffness must be increased. A minimum stiffness is found when the Digital Storage Element static deflection is equal to the defined allowable deflection.

Support arm stiffness, denoted as $K_a$, is a function of E, L, and I or R where E=Young's modulus
L=length of the support arm
B=width of the support arm
H=height of the support arm
I=moment of inertia~cross section~$(B H^3)/12$ for support arm with rectangular cross section
R=radius of cross section (for support arm with circular cross section)

Accordingly, for a support arm having a rectangular cross section, the support arm stiffness is:

$$K_a \sim EI/L^3 \quad (1)$$

for a support arm having a circular cross section, the support arm stiffness is:

$$K_a \sim ER^4/L^3 \quad (2)$$

It is important to understand that $K_a$ is generally more responsive to changes in geometry than to changes in the material(s) from which the support arm is formed.

Modal analysis is now performed to obtain the mode shapes and the frequencies of at least the first few modes. To that end, the natural frequencies $f_n$ and the angular velocities $\omega_n$ of the overall support system are functions of support system parameters K and M where:

$$f_n \sim \omega_n \sim (K/M)^{0.5} \quad (3)$$

in which:
K=stiffness of the overall support system or arrangement which in this case is mainly governed by the support arm stiffness $K_a$, and
M=mass of the digital storage plus at least a suspended portion of the mass of the support arms.

Typically, the first few modes are the low bending modes of the attachments, which allow rigid body translations and rigid body rotations of the Digital Storage Element. These natural frequencies are then compared with the shock frequencies, as follows.

Let β be a ratio between the shock and the natural frequencies:

$$\beta = \omega_i/\omega_n = f_i/f_n \quad (4)$$

In which $\omega_i$, $f_i$ are the input shock angular velocity and frequency, respectively, and $\omega_n$, $f_n$ are the natural angular velocity and frequency.

For the purpose of optimizing shock attenuation, a large value of β is desired which must be greater than one. It in generally desired that β>2, and, more preferably, β>4. It is noted that the output/input ratio of the displacement amplitudes and the output/input ratio of the acceleration amplitudes decrease as the value of β increases. The output/input ratio of the displacement amplitudes, however, decreases more slowly than the output/input ratio of the acceleration amplitudes.

A larger value of β results in correspondingly smaller values of $\omega_n$ and $f_n$ (or larger values for $\omega_i$ and $f_i$, but generally these latter input parameters are defined and can not be changed in a given design). Therefore, a lower value for $K_a$ is desired. As evidenced by equations 1 and 2 above, the most expedient ways to decrease $K_a$ are by increasing the attachment length, decreasing its cross section, and/or manipulating the geometry configuration of the attachment. It should be appreciated that changing attachment length and/or any other aspect of geometric configuration may mandate some manipulation/change of the Digital Storage Element corner shape.

When the input shock frequency range is very large, difficulties may be introduced with regard to attenuating the lower portion of this shock frequency range. In such a situation, generally, the shock attenuation effort should be concentrated on the higher portion of the shock frequency range, at least for the reason that the amplitude of shock movement is generally higher than the amplitude of shock movement produced in the lower portion of the shock frequency range. In this regard, resilient bumpers may be used to facilitate mitigation of mechanical shock having components which will occur in the lower portion of the shock frequency range. Such bumpers may be integrated with the attachments, the cover arrangement, and/or the base arrangement of the digital storage, as will be described in further detail below. For the moment, it is worthwhile to mention that the use of bumpers reduces the allowable movement margin that is available between the host and the Digital Storage Element. For this reason, it is desirable to hold the projecting height of the bumpers to a minimum, especially in the instance where a relatively small movement margin is also desired.

In view of the foregoing descriptions, with sufficient iteration, an appropriate attachment stiffness $K_a$ may be identified so as to attenuate most, if not all of a specified input shock frequency range. Having identified this attachment stiffness, a more detailed Finite Element model may then be formulated in order to accomplish still further analysis and design optimization.

Figure 5:
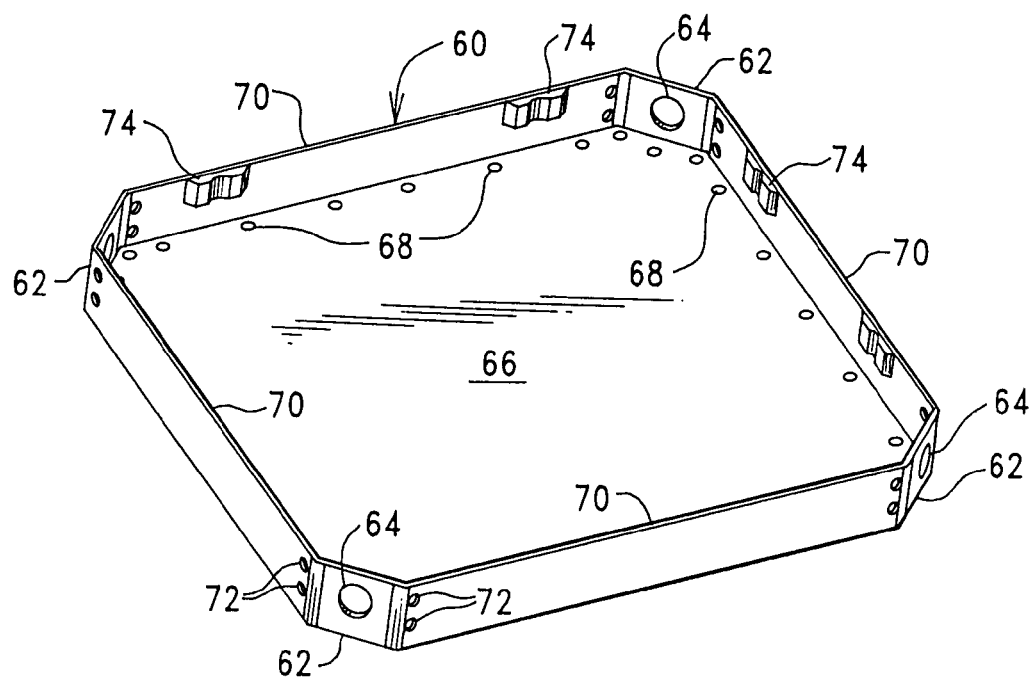
FIG. 5 is a diagrammatic view, in perspective, of a cover portion which forms part of the housing of the Digital Storage Element of the present invention, shown here to illustrate one potential implementation of the cover portion including its corner configurations, apertures defined by the cover portion and latching members.

Turning now to FIG. 5, attention is now directed to specific details with regard to the construction of housing 12, initially shown in FIGS. 1 and 2. FIG. 5 illustrates a cover portion 60, which forms part of the housing, and is configured to be received on a base portion that is yet to be described. The cover portion of the housing is shown in one implementation that is formed using a sheet material such as, for example, stainless steel. Generally, cover portion 60 is formed by stamping, however, the present invention contemplates the use of any suitable material, accompanied by any suitable fabrication technique. For example, the cover portion may be machined. Cover portion 60 includes a plurality of beveled corner regions 62 each of which defines a corner region through-opening 64. A major side 66 of cover portion 60 defines a first plurality of bumper apertures 68 while a peripheral sidewall 70 extends generally transverse to major side 66 and is integral therewith to define a second plurality of bumper apertures 72. While a pair of apertures is shown, it should be appreciated that any suitable number and/or shape of such apertures may be used. For example, an elongated slot may be used. As will be further described, where a pair of apertures 72 is used, the bumper may be molded continuously between the apertures proximate to the exterior surface of the cover portion. It is noted for purposes of clarity that, in the view of FIG. 5, peripheral sidewall 70 extends upwardly. Further, peripheral sidewall 70 defines a plurality of raised latching members 74, as will be further described at an appropriate point hereinafter.

Figure 6:
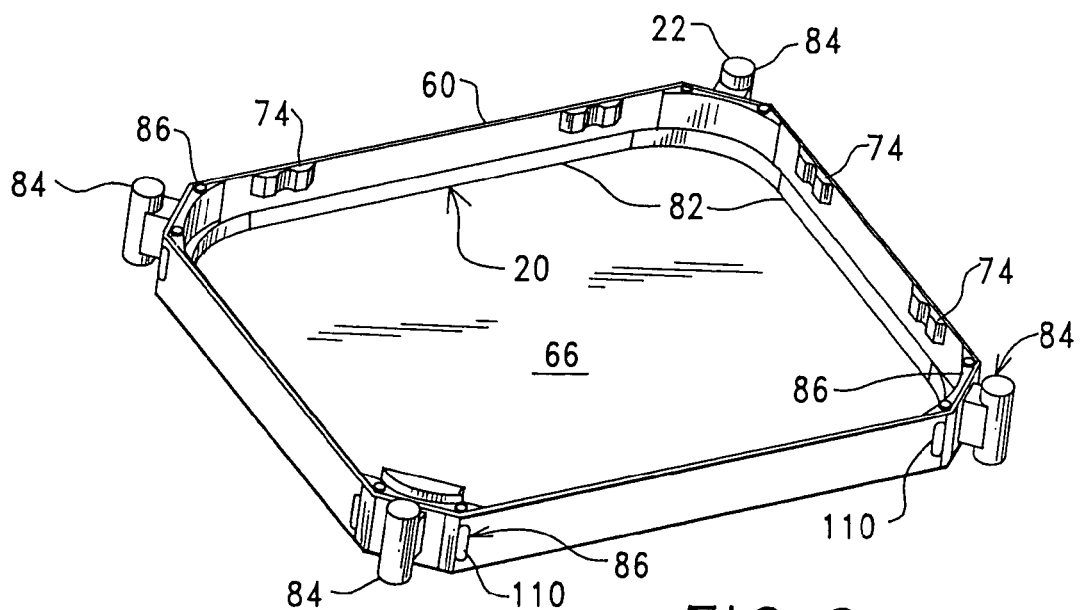
FIG. 6 is a diagrammatic view, in perspective, of the cover portion of FIG. 5 including a resilient arrangement which is molded to the cover portion for use in resiliently supporting the Digital Storage Element, for sealing the Digital Storage Element and for protecting the Digital Storage Element from contact with the host device using a bumper configuration.

Referring to FIG. 6 in conjunction with FIG. 5, previously mentioned resilient support arrangement 20 is supported within cover portion 60 in a highly advantageous way. Specifically, the resilient support arrangement is molded, in place, within the cover portion so as to form four functional subassemblies including: (i) a gasket portion 82; (ii) a support arm portion 84, including previously described support arms 22; (iii) a bumper portion 86 (only partially shown); and a recirculation filter holder. Descriptions of each of these subassemblies will be taken up immediately hereinafter.

Referring to FIGS. 1, 2, 4, 5, and 6, gasket portion 82 is molded into a peripheral corner region of the cover portion so as to surround major side 66. FIGS. 1, 2, and 5 illustrate first plurality of bumper apertures 68 defined by major side 66. This first plurality of bumper apertures is positioned within the corner region of the peripheral cover portion such that the gasket portion is molded into and extends outwardly through these bumper apertures. In doing so, that portion of the resilient support arrangement which extends into and through the bumper apertures serves a dual purpose. First, the gasket portion is at least partially held in position within the cover portion. Second, a first plurality of bumpers 90 (see FIGS. 1, 2 and 4) is formed so as to extend outwardly from major side 66 of cover portion 60. These bumpers are highly advantageous in extending completely about the periphery of major side 66. In this regard, it should be appreciated that, while these bumpers are highly useful in protecting Digital Storage Element 10 from mechanical shock that is incurred, for example, as a result of dropping the Digital Storage Element in transit, these bumpers are specifically configured for protecting the Digital Storage Element from mechanical shock in situ. That is, first plurality of bumpers 90, like those yet to be described, are designed to provide an additional measure of protection for the Digital Storage Element when a mechanical shock is received by a host device so as to cause the Digital Storage Element to move in a way which would otherwise bring housing 12 into direct contact with the host device. As mentioned previously, since these bumpers extend outwardly from the Digital Storage Element, they themselves limit the available movement margin which is defined around the Digital Storage Element within the host device. Therefore, first plurality of bumpers 90, like other bumpers yet to be described, extend outwardly beyond the overall outline of the Digital Storage Element only slightly for purposes of maximizing the available movement margin that is present around the digital storage arrangement. In the present example, the height of the bumpers is contemplated as extending beyond the outline of the Digital Storage Element by approximately 0.5 mm.

Referring to FIGS. 5 through 7a, attention is now directed to further details with regard to the design of the resilient arrangement of the present invention including gasket portion 82 and bumper portion 86. It should be appreciated that these various subassemblies are described in a somewhat intermingled manner for the reason that all of the subassemblies are integrally formed. Further, certain portions of the resilient arrangement may functionally fall within more than one of the subassemblies. For example, referring to FIG. 7a, resilient arrangement 20 includes a corner portion 100 which is shown in a partial, enlarged view of one corner of cover portion 60. Corner portion 100 extends integrally from gasket portion 82 into the corner region of the cover portion, proximate to and along a margin of peripheral sidewall 70. At the same time, corner portion 100 is molded through one of corner region through-openings 64 (see FIG. 5) to form outwardly extending support arm 22, having its previously described configuration. This arrangement is considered as being highly advantageous since corner portion 100 is formed having a configuration and overall contact area with the corner region so as to provide a solid foundation for support arm 22. In providing a further advantage, a second plurality of sidewall bumpers 110, seen in FIG. 6 and forming part of bumper portion 86, are molded from corner portion 100 through second plurality of bumper apertures 72, seen in FIG. 5, to serve in a dual capacity. First, the second plurality of bumpers extends outwardly, beyond the outline of the Digital Storage Element, to functionally serve as bumpers while, second, the second plurality of bumpers further serves to anchor the corner portion so as to assist in providing a foundation for support arm 22. While sidewall bumpers are illustrated as being formed proximate to the corner region of cover portion 60 and integral with corner portion 100 of the resilient arrangement, it is to be understood that the present invention contemplates the formation of sidewall bumpers around the entire periphery of the sidewall, which may readily be formed integrally with gasket portion 82.

Figure 7A:
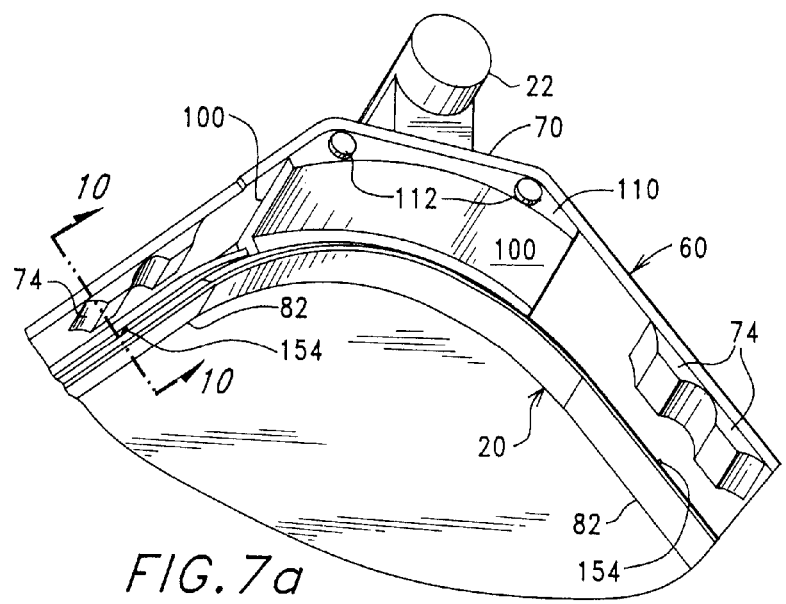
FIG. 7a is an enlarged, partial view, in perspective, of one corner of the cover portion of FIG. 6, shown here to illustrate details of a resilient arrangement including a corner portion from which a resilient support arm extends.
Figure 8:
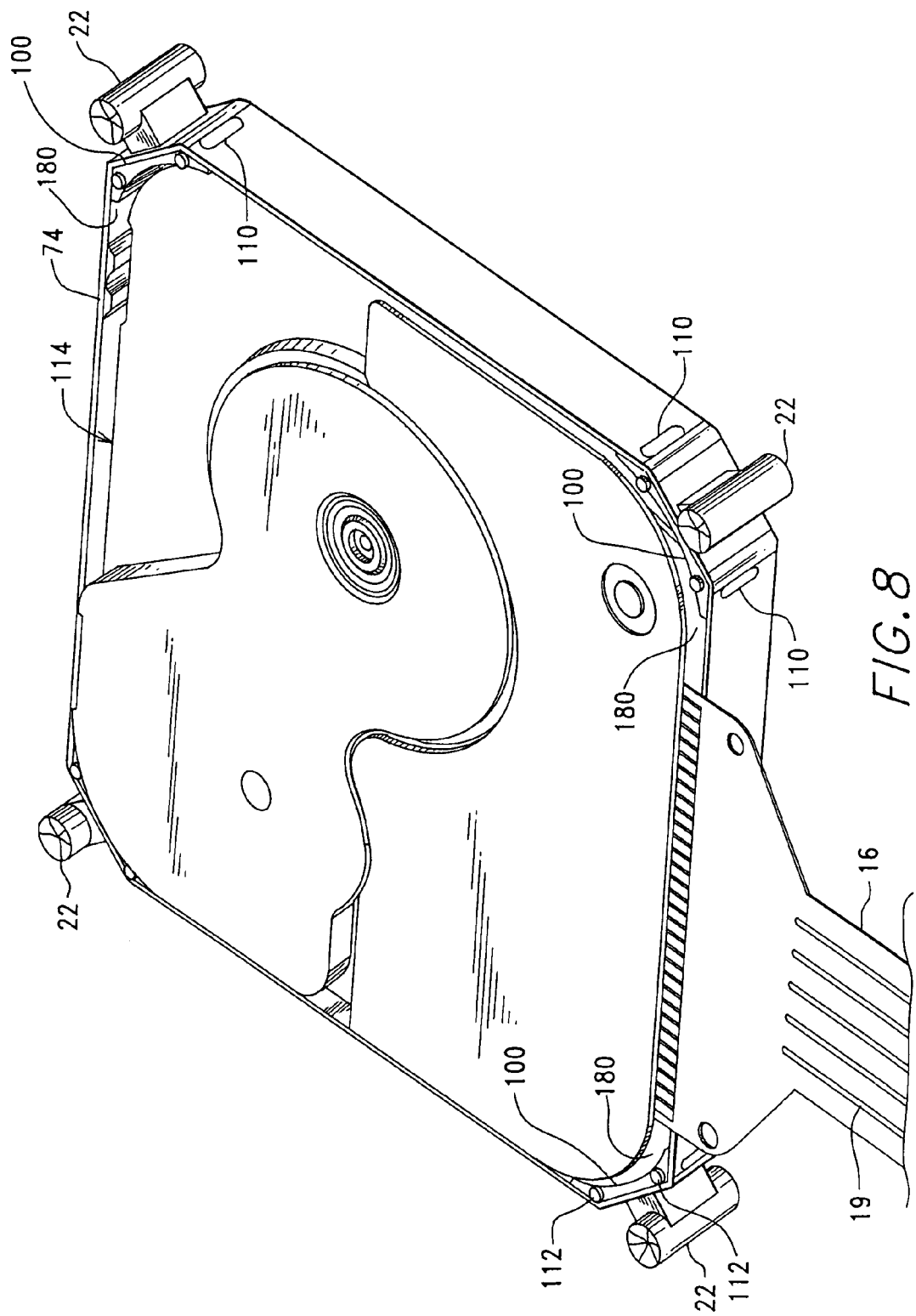
FIG. 8 is a diagrammatic, enlarged view, in perspective, of the Digital Storage Element of the present invention, shown here to illustrate the installation of a base portion within the cover portion. A bottom-side bumper configuration is further illustrated that is integrally formed with the corner portions of the resilient arrangement.

Continuing with a description of the various subassemblies which form portions of resilient arrangement 20, reference is now taken to FIGS. 7a and 8. As illustrated in FIG. 7a, corner portion 100 defines an upper surface 110 which further defines a pair of integrally molded bottom surface bumpers 112. Again, it is to be understood that terms such as "bottom" are used for descriptive purposes within the context of the drawings and are in no way intended as being limiting. FIG. 8 illustrates cover portion 60 assembled with a base portion 114 using a latching arrangement which will be described in further detail at an appropriate point below.

With the cover portion and base portion in the illustrated, assembled configuration, bottom surface bumpers 112 are arranged so as to extend outwardly, beyond the outline of the Digital Storage Element, as defined by the outer surface of base portion 114. Accordingly, resilient bumpers may be provided outwardly from every surface of Digital Storage Element 10, surrounding the outline of the Digital Storage Element such that, when the latter moves in any of six degrees of freedom relative to the host device by a sufficient amount, initial contact between the host device and the Digital Storage Element is made by one or more resilient bumpers. In this regard, it is noted that the resilient support arrangement of the present invention, including support arms 22, is designed for constraining the movement of the digital storage arrangement for anticipated mechanical shock forces having preselected magnitudes and frequencies over a specified range. In this way, the resilient support arrangement of the present invention may be tailored to a particular range of shock forces to which the Digital Storage Element is thought to be most susceptible. The value of the bumper system of the present invention, which surrounds the outline of the Digital Storage Element, resides primarily in protecting the Digital Storage Element from mechanical shock forces that are outside the most susceptible range of shock forces. Accordingly, protection from mechanical shock forces across an overall range is thought to be enhanced in a sweeping manner which has not been seen heretofore.

Figure 7B:
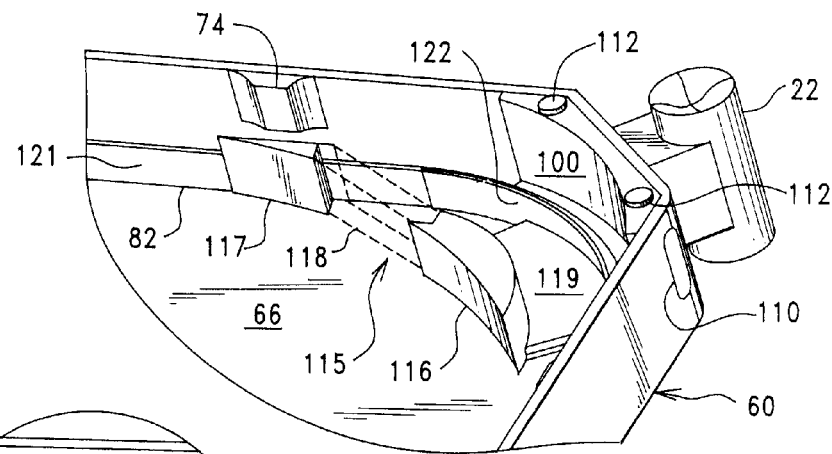
FIG. 7b is an diagrammatic, partial view, in perspective of another corner of the cover portion of FIG. 6, here to illustrate details of an integrally formed recirculation filter support arrangement, which itself forms a portion of the highly advantageous resilient arrangement of the present invention.

Turning to FIG. 7b, a particular corner of cover portion 60 is shown in a partial, enlarged view, with previously described corner portion 100 of the resilient arrangement positioned therein. Additionally, however, this particular corner includes a recirculation filter support arrangement which is generally indicated by the reference number 115 and which extends inwardly and integrally from gasket portion 82 so as to form another portion of the resilient arrangement of the present invention. Recirculation filter support arrangement 115 includes a first end support 116 and a second end support 117 for supporting and capturing first and second ends of a recirculation filter 118, which is shown in phantom using dashed lines. With the recirculation filter in the illustrated position, attaching the cover portion to a base portion serves to capture the recirculation filter between major side 66 of the cover portion and the base portion, while its lateral position is maintained by end supports 116 and 117. Further, first end support 116 is offset from gasket portion 82 by a web 119. This web cooperates in a highly advantageous way with first end support 116, a sidewall 121 of gasket portion 82 and an attached base portion to define a filter passage 122 which routes air within the Digital Storage Element cavity through recirculation filter 118. The airflow is itself generated in a conventional manner as a byproduct of rotation of a rotating media within the Storage Element, yet to be described.

Figure 7C:
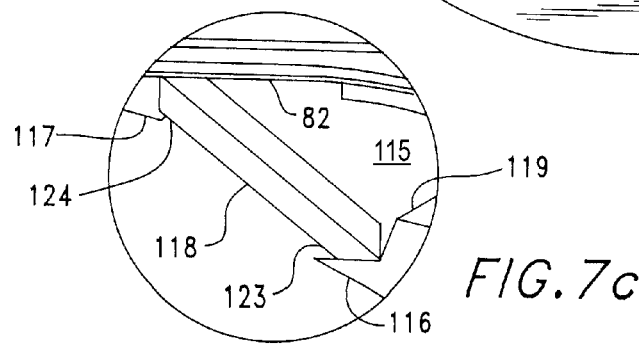
FIG. 7c is a diagrammatic enlarged view of a portion of the illustration of FIG. 7b, shown here to illustrate details of the highly advantageous recirculation support arrangement of the present invention.

Referring to FIG. 7c in conjunction with FIG. 7b, attention is directed to further details relevant to the recirculation filter support arrangement. In particular, FIG. 7c is a partial, further enlarged plan view showing recirculation filter 118 captured by the first and second support arrangements 116 and 117, respectively. The periphery of the recirculation filter, including its first and second ends 123 and 124, respectively, includes a V-shaped configuration, seen in FIG. 7c. The V-shaped configuration serves in capturing the filter ends within V grooves defined by first and second end supports 116 and 117, respectively. Moreover, since the filter is generally formed from a somewhat resilient filtering material, its V-shaped periphery may additionally serve to seal its upper and lower edges against the base and cover portions, respectively, when the cover is installed on a base portion. The described recirculation filter support and passage defining arrangement is considered as being highly advantageous at least for reasons including multiple functionality as well as being integrally formed with the gasket portion. It is important to understand that the present invention contemplates the use of the gasket portion to provide other, integrally formed features for purposes such as, but not limited to holding items in position at any suitable point proximate to its periphery. Such holding features, for example, may be in the shape of a pillar pushing and/or pulling certain parts at desired distances from the cover portion.

Referring now to FIG. 9, base portion 114 is shown including digital storage device 14. The latter is made up of a rotatable magnetic media 125, an actuator arm 126 for accessing the rotatable magnetic media and a voice coil motor assembly 128 for selectively moving the actuator arm. An intermediate support assembly 130 includes an intermediate support and a flexible circuit along with a ramp 132 for receiving the actuator arm in a parked position, as is described in copending U.S. patent application Ser. No. 09/952,998 entitled DIGITAL DEVICE CONFIGURATION AND METHOD, filed on Sep. 14, 2001 which is commonly assigned with the present application and is incorporated herein in its entirety by reference. A base plate 140 serves in supporting the aforedescribed components. The base plate further defines a plurality of latching recesses 142 (only four of which are visible) that are engaged by previously described latching members 74 (see, for example, FIG. 5) for the purpose of attaching cover portion 60 to base portion. It is noted that this configuration is considered as being highly advantageous at least for the reason that threaded fasteners are not employed. The latter are notoriously known as producing contaminants during threaded engagement. In this regard, it should be appreciated that base portion 114 should be positioned within cover portion 60 by expanding peripheral sidewall 70 of the cover portion temporarily outward in a suitable manner such that the base portion may be positioned within the cover portion without slidingly engaging latching members 74 against base portion 114. Having properly positioned the cover portion and base portion relative to one another, the cover portion is then released such that latching members 74 are moved into latching recesses 142. In this way, contamination produced by rubbing the latching members against sidewalls of the base portion is substantially avoided. Specific details with regard to the seal that is achieved using gasket portion 82 of resilient arrangement 20 captured between the base portion and the cover portion will be described immediately hereinafter. At this juncture, it is appropriate to note that the Digital Storage Element incorporates a breather filter (not shown) such that atmospheric gasses, under anticipated conditions, pass only through the breather filter for purposes of equalizing changes in ambient pressure and for sealing airborne contaminants out of the enclosure.

Referring to FIG. 10 in conjunction with FIGS. 7a and 9, a partial diagrammatic cross-sectional view is shown taken through the corner region of cover portion 60. In this view, cover portion 60 is shown along with one of latching members 74. Gasket portion 82 is further illustrated, arranged in the peripheral corner region of the cover portion and including a peripheral, upstanding resilient sealing lip or collar 150 which is angled toward peripheral sidewall 70 for purposes of engaging a peripheral sealing rim 152 (see FIG. 9) that is defined by base portion 114, as will be seen. Gasket portion 82 further includes a resilient biasing cone 154. At least two of these resilient biasing cones are formed spaced apart on each edge of gasket portion 82. Further details with regard to sealing lip 150 and resilient biasing cones 154 will be provided immediately hereinafter.

Turning to FIG. 11, cover portion 60 is shown in the same cross-sectional view as that of FIG. 10, but including base portion 114 (only partially shown) installed within the cover portion such that peripheral sealing rim 152 engages peripheral sealing lip 150 of the gasket portion. With this engagement, angled peripheral sealing lip 150 moves against the peripheral sealing rim and applies a self-biasing resilient force thereto as a result of the angled configuration of peripheral sealing lip 150. Contact between the peripheral sealing rim and the peripheral sealing lip serves in a highly advantageous way to seal the inner cavity of Digital Storage Element 10, which contains storage device 14. As briefly described above, it is preferable to initially position base portion 114 within cover portion 60 by first moving or temporarily biasing peripheral sidewall 70 outward, in the direction indicated by an arrow 160. The cover portion is then placed into position and the peripheral sidewall is released so that latching members 74 engage latching recesses 142. One latching member is shown, by FIG. 11, in an engaged position within a latching recess. It should be appreciated that a seal is achieved between an inner sidewall 162 of rim 152 and peripheral sealing lip 150 before the base portion is fully received into the cover portion and thereafter maintained within a predetermined vertical (in the view of the figure) movement range of the cover portion, such that the inner cavity of the Digital Storage Element is fully sealed once latching recesses 142 and latching member 74 achieve an aligned position and are, thereafter, released. Therefore, any contamination generated by contact between the latching member engaging its opposing latching recess is produced after sealing the cover portion and base portion to one another. In and by itself, this configuration is considered to be highly advantageous. As will be further described, the seal is advantageously maintained even when the cover portion compresses the biasing cones by an amount that is greater than required for purposes of releasing the latching members. Moreover, the seal is maintained even with lateral, relative movement between the cover portion and base portion. This lateral movement is facilitated by sway spaces 163 between peripheral sidewall 70 and peripheral sealing rim 152 and between latching member 74 and base portion 114.

Still referring to FIG. 11, attention is now directed to specific details concerning resilient biasing cones 154, which are distributed about the peripheral gasket portion, and one of which is shown in FIG. 11. As cover portion 60 and base portion 114 are brought into the engaged position, a lower surface 156 of peripheral sealing rim 152 contacts resilient biasing cone 154, which is integrally formed with gasket portion 82. Each resilient biasing cone 154 includes a configuration which cooperates collectively with the remaining biasing cones to bias cover portion 114 upward, in the view of the figure, so as to maintain contact between latching member 74 and the cover portion at a contact point 164 under static conditions. The use of resilient biasing cones is highly advantageous for the purpose of maintaining a predetermined outward bias force against lower surface 156 of peripheral sealing rim 152 in a direction that is indicated by an arrow 166. Such controlled force provides the ability to relatively precisely control the amount of bias force that is applied. In this regard, if lower surface 156 of peripheral sealing rim 152 is, at once, brought into contact with the overall periphery of gasket portion 82, thereby capturing the gasket portion, other than peripheral sealing collar 150, between the base and cover portions, the gasket portion will present a relatively high stiffness. The latter may be problematic with regard to providing the ability to move the base portion sufficiently into the cover portion in order to permit engagement of latching members 74 with latching recess 142 in a desired manner, as will be further described. By using resilient biasing cones 154 of the present invention, a stepped stiffness arrangement is produced whereby, during an initial contact step, a controlled initial stiffness is presented as lower surface 156 contacts and compresses resilient cones 154. If movement of the base portion continues, a subsequent stiffness step is encountered in which dramatically higher force is required to continue movement of peripheral sealing rim 152 into gasket portion 82. The use of the resilient biasing cones provides for latching of the cover and base portions in a highly desirable fashion, as will be described in detail immediately hereinafter.

Figure 12:
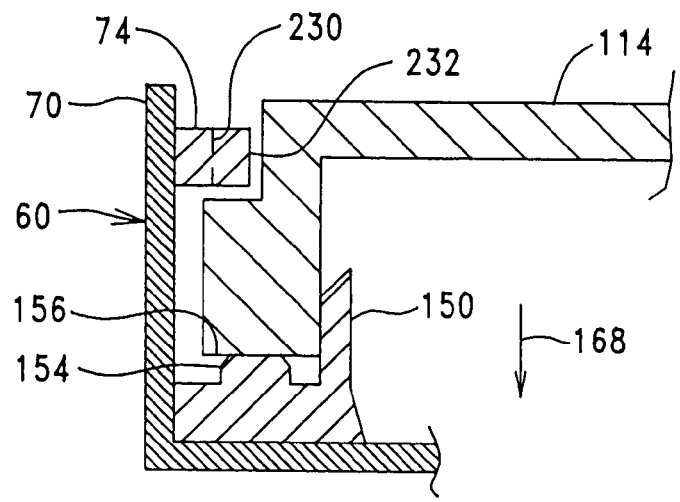
FIG. 12 is the diagrammatic, enlarged cross-sectional view of the corner region of the cover portion, as shown in FIG. 11, engaged with the base portion, showing movement of the cover portion relative to the base portion which compresses the biasing pedestal.
Figure 13:
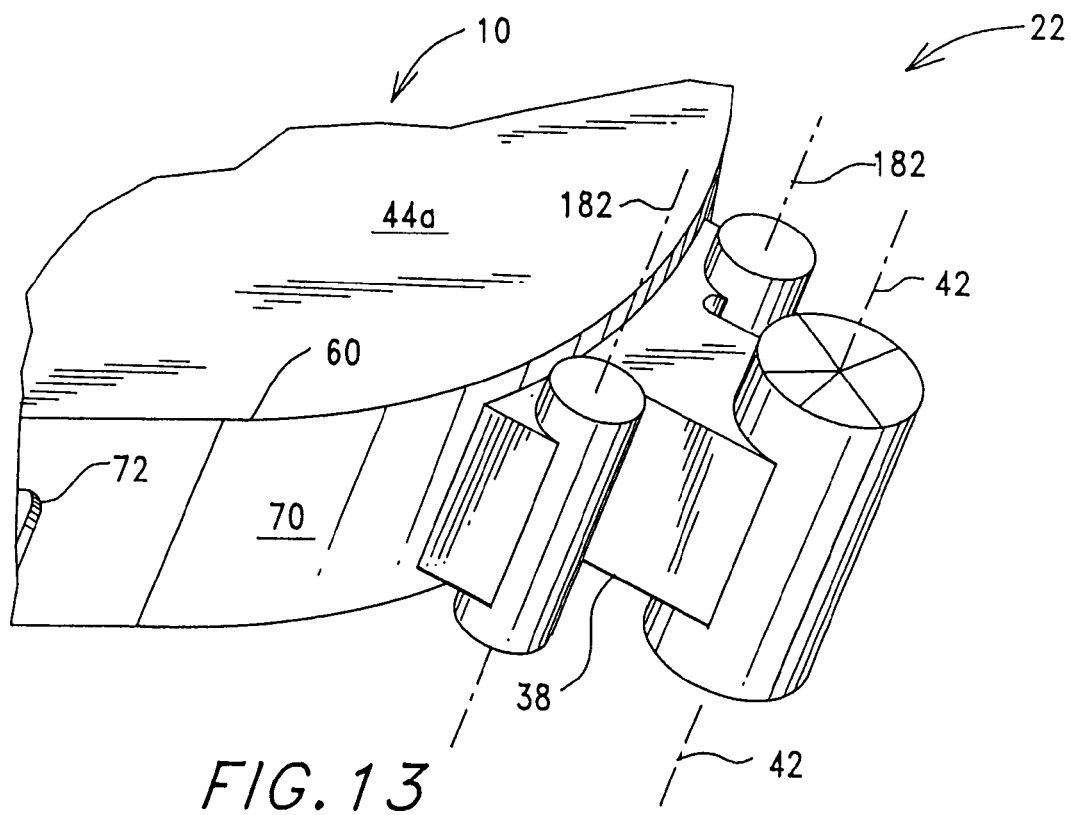
FIG. 13 is a diagrammatic enlarged view, in perspective, of one corner of the cover portion of the Digital storage Element, shown here to illustrate an alternative embodiment of the shock mounting arm or resilient support arm of the present invention.

Referring to FIG. 12 in conjunction with FIG. 13 and continuing with a description of the stepped bias configuration used in resiliently biasing cover portion 60 and base portion 114 away from one another, during the process of attaching the base and cover portions, it is desirable to move base portion 114 downward in a direction indicated by an arrow 168, as shown in FIG. 12, to compress biasing cone 154 by an amount which allows each latching member 74 to move into its associated latching recess 142 without contacting base portion 114. Contact is then allowed to occur by releasing base portion 114 so as to permit it to move upward, as shown in FIG. 11, to contact latching member 74 at contact point 164. Thus, potential contamination-producing rubbing is avoided between latching member 74 and base portion 114 at contact surface 174. In order to facilitate this desired engagement process, resilient cones 154 are configured such that the base portion and cover portion may be attached to one another using only the initial, controlled stiffness afforded by the resilient biasing cones. That is, the aforedescribed subsequent stepped stiffness step, presented by lower surface 156 of sealing rim 152 engaging the entire periphery of gasket portion, is not entered. This arrangement is considered as highly advantageous for a number of reasons including that of providing a relatively low, consistent value of biasing force during the mating of the cover and base portions. It should be appreciated that throughout the process of vertical movement required for installation of the cover portion onto the base portion, the aforementioned vertical movement range maintains a seal between the cover and base portions. As will be described immediately below, such provisions for movement of the base portion relative to the cover portion are also highly advantageous with regard to mitigating the effects of mechanical shock, particularly in view of the manner in which the Digital Storage Element is supported. Another highly advantageous implementation of the latching member of the present invention will be described at an appropriate point below, which still further enhances mechanical shock mitigation.

Referring initially to FIGS. 8 through 12, attention is now directed to a highly advantageous aspect of the structure described above which still further enhances protection of digital storage arrangement 14 (see FIG. 9) from the effects of mechanical shock received by the Digital Storage Element of the present invention. In one aspect of this advantage, alluded to above, base portion 114 is resiliently supported in a way which allows it to "float" or move relative to cover portion 60. In this regard, it is important to understand that digital storage arrangement 14 is supported by base portion 114 which is, in turn, supported by cover portion 60. The aforedescribed resilient support arrangement (see, for example, FIG. 8) extends between the cover portion and the host device. In this way, digital storage arrangement 14 is protected by at least two separate levels of mechanical shock isolation. Specifically, the resilient support arrangement extends between the host device and the Digital Storage Element to provide a first level of isolation, while the base portion, floating within the cover portion of the Digital Storage Element, serves to provide a second level of isolation. A number of aspects of the described structure contribute to this advantage, each of which will be taken up in subsequent discussions. Moreover, a damping configuration is provided which further serves to cushion and/or limit movement of the base portion relative to the cover portion when such movement does occur.

Referring to FIGS. 11 and 12, it should be appreciated that movement of base portion 114 relative to cover portion 60 is facilitated, in part, by peripheral sealing collar 150. The latter, in the view of FIG. 11, provides for vertical, as well as lateral relative motion of the base portion within a predetermined range while still maintaining a seal between the cover portion and the base portion. At the same time, vertical and lateral relative motion is permitted by the configuration of biasing cones 154 cooperating with latching members 74. The latter may move laterally and vertically within latching recesses 142. Compression of biasing cones 154 and, in the instance of higher levels of mechanical shock, subsequent compression of the overall periphery of gasket portion 82 (see, for example, FIG. 7) provides for vertical as well as lateral relative motion.

With regard to the specific configuration illustrated in FIGS. 11 and 12, it is to be understood that any suitable modification is contemplated and considered as being within the scope of the appended claims so long as the teachings herein are applied. For example, resilient biasing cones 154 may be replaced by biasing pedestals having any number of alternative forms in order to provide the contemplated stepped biasing arrangement. That is, a conical shape is not required and any suitable number of biasing pedestals may be provided about the periphery of gasket portion 82.

Moreover, the illustrated configuration of cover portion 60 cooperating with peripheral sealing lip 150 of the gasket portion may be modified in any suitable manner so long as a seal is achieved between the cover portion and the base portion. Likewise, the configuration of latching recesses 142 may be modified in any suitable manner.

Turning to FIGS. 7a through 9, corner portions 100, which form a portion of the resilient arrangement, are positioned between the corners of base portion 114 and cover portion 60 when the cover portion is selectively attached to the base portion. At the same time, a sway space 180 (see FIG. 8) is provided between each corner portion and the confronting corner of the base portion. With sufficient movement of the base portion inside the cover portion, the base portion corner moves through this sway space and engages corner portion 100 of the resilient arrangement. Accordingly, the corner portion serves in a highly advantageous way to cushion and dampen the relative movement, thereby mitigating the effects of mechanical shock on digital storage arrangement 14 supported by base portion 114.

Referring to FIG. 13, attention is now directed to an alternative embodiment of the shock mount of the present invention, generally indicated by the reference number 22' and illustrated diagrammatically. Since design considerations as well as functional aspects of shock mount 22' are essentially identical to those of previously described shock mount 22, shown in FIG. 4, the reader is referred to those shock mount descriptions which appear above. Descriptions of shock mount 22' will be limited, for the most part, to differences between the two embodiments. It is worthwhile to emphasize, however, that shock mount 22' may readily be formed as an integral portion of an overall resilient arrangement. Like shock mount 22, shock mount 22' may be molded through a corner region through-opening such as is shown in FIG. 5, as indicated therein by the reference number 64. In addition to its previously described features, shock mount 22' further includes a pair of elongated bumpers 180 that are arranged proximate to a side margin of peripheral sidewall 70, positioned outward of beam portion 38. Each bumper 180 defines an elongation axis 182 that is generally normal to a plane which contains major surface 44a. Moreover, each bumper 180 extends outward with respect to planes coincident with the upper and lower major surfaces of Digital Storage Element 10. That is, outside the overall outline of the Digital Storage Element. While support cylinder 40 at the distal end of the shock mount is fixedly captured by the host device (see FIGS. 3 and 4), bumpers 180 are configured to move with Storage Element 10 and relative to the host device when a mechanical shock force is received by the host device. When the Digital Storage Element experiences movement having a component oriented along elongation axes 182 having a sufficient magnitude, bumpers 180 are configured for contacting the host device prior to any other contact occurring directly between the host device and Digital Storage Element 10. Benefits derived from such an arrangement have been described above with regard to an anticipated range of shock forces and frequency. The columnar configuration of bumpers 180 is shown here for illustrative purposes only and is not intended to be limiting. Accordingly, any configuration serving bumper functionality may be provided proximate to peripheral sidewall 70 as part of the shock mount of the present invention.

Figure 14:
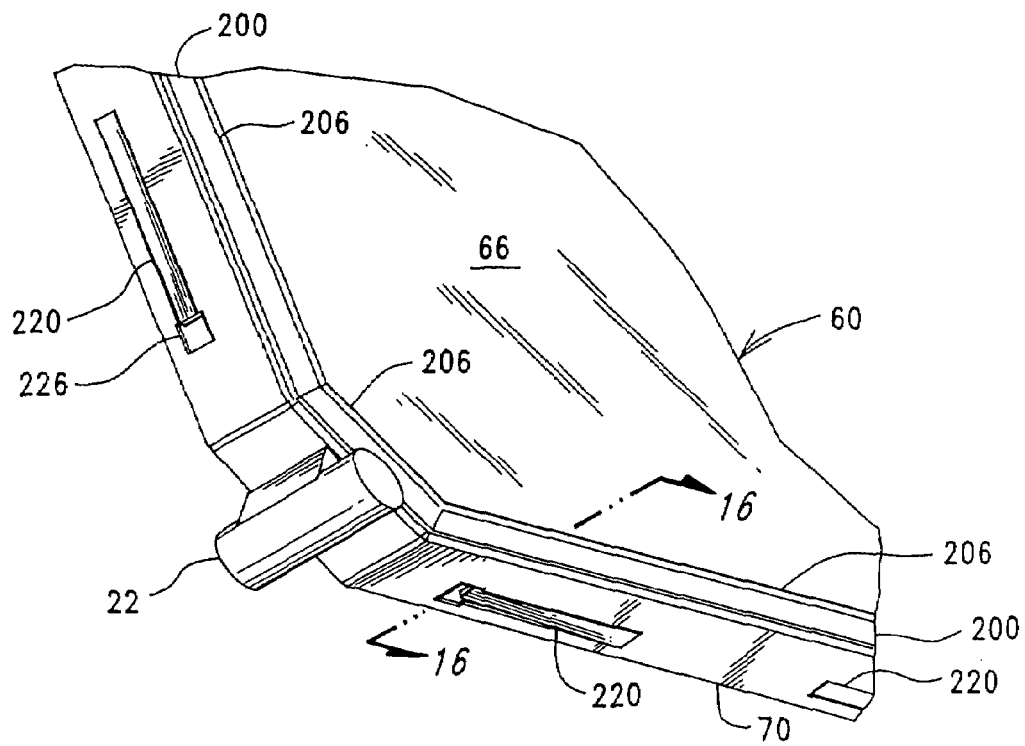
FIG. 14 is a diagrammatic, enlarged view, in perspective, of one corner of the cover portion of the Digital storage Element of the present invention, showing the outside of the corner and illustrating details of an alternative latch member for use in attaching the cover portion to a base portion.
Figure 15:
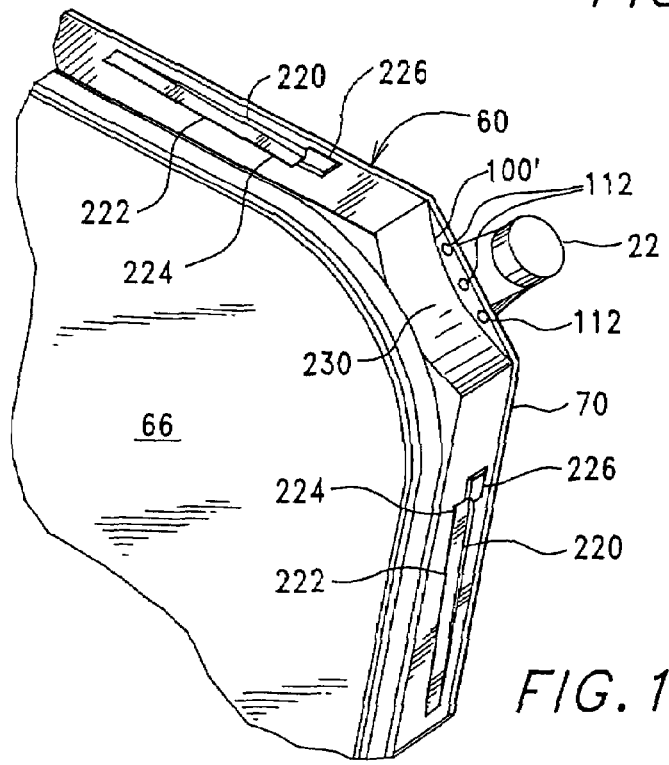
FIG. 15 is a diagrammatic, enlarged view, in perspective, of the corner of the cover portion shown in FIG. 14 but showing the interior of the cover portion at this corner for purposes of illustrating further details of the alternative latch member.
Figure 16:
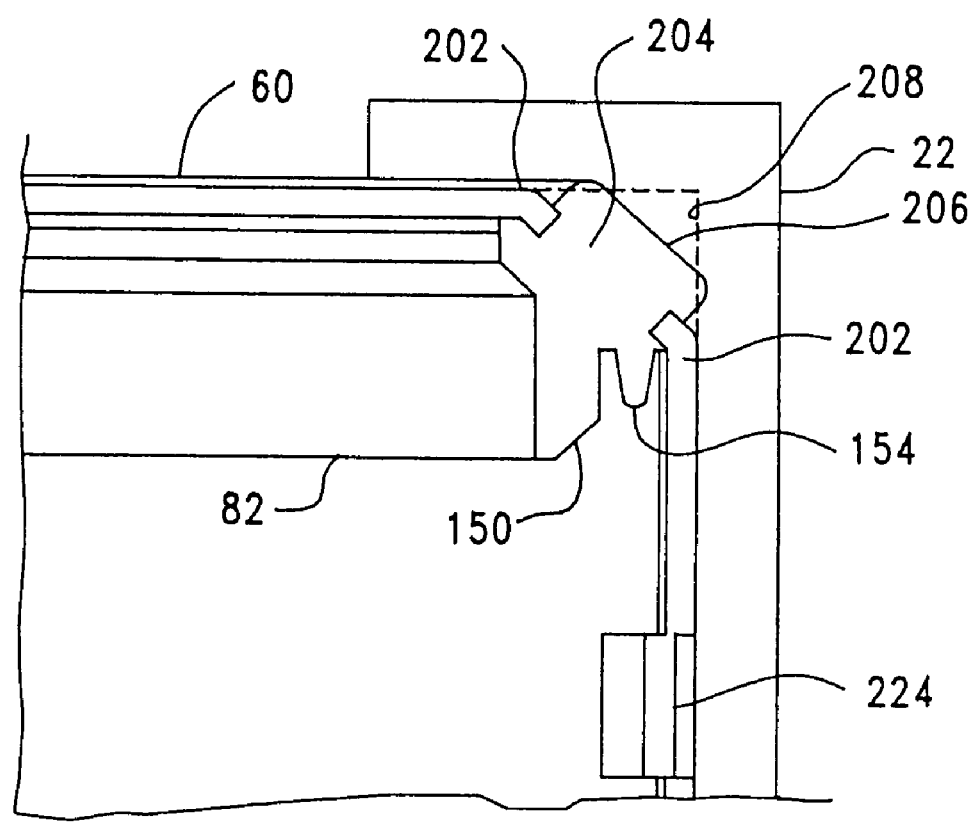
FIG. 16 is a diagrammatic, enlarged cross-sectional view, taken generally along a line 16-16 in FIG. 14, illustrating details with respect to a highly advantageous and integrally formed corner bumper that is produced in accordance with the present invention.

Attention is now directed to FIGS. 14 through 16 for the purpose of describing a number of alternative, but highly advantageous features which may be incorporated in cover portion 60. FIG. 14 is an outside, perspective view of one corner of the cover portion, while FIG. 15 is an inside, perspective view of the corner of the cover portion. FIG. 16 is a partial cross-sectional view taken through the cover portion along a line 16-16 which is indicated in FIG. 14 and will be further described. The present discussion will be limited to items which differ from those described above, for purposes of brevity.

Referring to FIGS. 14 and 16, the illustrated embodiment of cover portion 60 is formed having a beveled peripheral corner 200 defining a surface, which may be flat, between a pair of opposing 45 degree bends 202 (best seen in FIG. 16). A plurality of through-openings 204 (one of which is shown in FIG. 16) are defined within the flat surface between bends 202 and about the entire periphery of the cover portion. Resilient arrangement 20 is then molded so as to extend from gasket portion 82, within the cover portion, outwardly from through-openings 204 to a peripheral, integrally formed corner bumper 206. Any suitable number of through-openings 204 may be formed along each side of the cover portion depending, for example, on support provided for corner bumper 206. It is noted that resilient cone 154, as well as peripheral sealing collar 150 are also visible in FIG. 16. Of course, the illustrated configuration of peripheral corner bumper 206 is not intended as being limiting, but may be modified in any suitable manner. For example, in one alternative embodiment, the peripheral corner bumper may include a configuration that is defined generally by (or within) a dashed line 208, in FIG. 16, such that the peripheral corner bumper is defined as being at least generally within the outline of cover portion 60 as viewed prior to the addition of beveled corner 200. That is, the outline of the corner bumper is at or within a corner region as defined by extension of the planes of the peripheral sidewall and the major side or panel of the cover portion. Accordingly, this configuration is advantageous in preserving the movement margin, which surrounds the Digital Storage Element of the present invention, while still providing protection against direct contact between the host device and the cover portion in the event that a mechanical shock received by the host device causes the cover portion to move completely through the movement margin. It should be appreciated that corner bumper 206 may extend continuously about the periphery of the corner portion. Alternatively, corner bumper 206 may be formed as any number of individual bumpers about the periphery of the cover portion using appropriate arrangements and numbers of through-openings 204.

Still referring to FIGS. 14 through 16, attention is now directed to a highly advantageous latching arm 220, which was briefly mentioned above. In the present example, latching arms 220 are formed in the peripheral sidewall of cover portion 60 by stamping, however any suitable method may be used. Each latching arm 220 includes a cantilevered, resilient body 222 (see FIG. 15) which extends to a distal end 224 that is also visible in FIG. 16. A notch 226 is formed immediately ahead of distal end 224 of each latching arm. Attaching this embodiment of the cover portion to a base portion may be accomplished by using an appropriate assembly tool to reach into each notch 226 so as to engage distal end 224 of each latching arm. The distal ends are then simultaneously pulled outward during placement of the cover portion onto a base portion 114 (see FIG. 9). Latching arms 220 may then be released to move into position within the latching recesses, as previously described with regard to latching members 74, in a manner which avoids rubbing the latching arms against the cover portion in a contamination-producing manner. With brief reference to FIG. 12, it is noted that the released distal end of the latching arm may occupy a region extending from a dashed line 230 and innermost edge 232 of previously described latching member 74, upon release of the latching arm into the latching recess. It is to be understood that, while illustrated as being straight and rectangular in cross-section, distal end 224 of the latching arms may include any suitable configuration such as, for example, a curved hook-like shape or an angled shape.

The use of latching arms 220 is considered as highly advantageous with regard to the aforedescribed second level of mechanical shock isolation, wherein the base portion floats within the cover portion, since the cantilevered latching arms themselves add a further degree of resilience in the attachment of base portion 114 to cover portion 60. Stated in a slightly different manner, a shock force received by the host device upon reaching cover portion 60 and being attenuated by the resilient support arrangement of the present invention, must then pass through a further level of resilient support in the form of latching arms 220, prior to reaching the base portion. It should be appreciated that any suitable number of latching arms may be used for purposes of attaching the cover portion to the base portion. While the present example uses a pair of latching arms formed in each peripheral sidewall of the cover portion, this is not a requirement.

Having generally described the configuration of latching arms 220, it should be appreciated that design considerations described above with regard to resilient support arms 22 are also applicable with regard to the configuration of the latching arms. The geometry of the latching arms including their length and width are adjustable in view of the thickness of the peripheral sidewall of the base portion in order to provide appropriate shock response.

With reference to FIGS. 14 and 15, the latter illustrates an alternative corner portion 100' which shown positioned within peripheral sidewall 70 having an arcuate shaped inner surface 230. It is noted that the presence of peripheral corner bumper 206 obviates the need for sidewall bumpers 110, the absence of which is seen by comparison of Figures.

At this juncture, it is worthwhile to again briefly consider the aforedescribed prior art. With regard to the use of rubber grommets for the purpose of mechanical shock mitigation, it is submitted that the resilient support arm arrangement of the present invention avoids the complex multi-mode response interaction that is presented by rubber grommets. From an analytical standpoint, therefore, the present invention facilitates the implementation of a precision control shock isolation arrangement through the described design approach. That is, the resilient support arm arrangement of the present invention responds in a significantly more predictable manner, such that response characteristics are readily modified by making geometric and/or material property changes. With regard to the '440 patent, it is submitted that a predictable, designed mechanical shock isolation response is essentially unachievable in view of a given shock force to be received by a host device or with regard to implementing an overall, designed response within an overall mechanical shock force magnitude and frequency range. The present invention, in contrast, provides such capabilities while, at the same time, requiring a receiving cavity defining a relatively small movement margin surrounding the Digital Storage Element. The '440 patent illustrates a relatively enormous movement margin, disadvantageously comprising a significant portion of the external hard drive case in which the hard drive is positioned.

Since the Digital Storage Element and resilient arrangement along with the associated method disclosed herein may be provided in a variety of different configurations and the method may be practiced in a variety of different ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. A digital storage arrangement, comprising:
   a housing including a cover portion for engaging a base portion to define a housing interior; digital storage means located within said housing interior;
   a recirculation filter for filtering air that is present within said housing interior, wherein said recirculation filter, captured between attached ones of the cover portion and the base portion, is in direct contact with the cover portion and the base portion; and
   a resilient arrangement including a sealing configuration for contacting said cover portion and said base portion attached thereto, for sealing said housing interior, and said resilient arrangement includes said sealing configuration integrally formed with a filter support configuration for supporting said recirculation filter, wherein said resilient arrangement supports the recirculation filter in a way which causes said recirculation filter to be captured between attached ones of the cover portion and the base portion.

2. The digital storage arrangement of claim 1 wherein said cover portion and said base portion cooperatively define a plurality of corner regions and wherein said filter support configuration is arranged at least approximately in one of said corner regions.

3. The digital storage arrangement of claim 2 wherein said resilient arrangement is attached at least at each of said corner regions.

4. The digital storage arrangement of claim 1 wherein the filter support configuration further defines, at least part, a filter passage for directing air through the recirculation filter.

5. In producing a digital storage arrangement, a method comprising:
   forming a housing including a cover portion for engaging a base portion to define a housing interior;
   locating digital storage means within said housing interior;
   providing a recirculation filter for filtering air that is present within said housing interior, wherein said recirculation filter, captured between attached ones of the cover portion and the base portion, is in direct contact with the cover portion and the base portion;
   locating a resilient arrangement in contact between attached ones of said cover portion and said base portion including a sealing configuration, for sealing said housing interior;
   integrally forming, as part of the resilient arrangement, said sealing configuration and a filter support configuration which supports said recirculation filter; and
   configuring the filter support configuration to support the recirculation filter in a way which captures the recirculation filter between attached ones of the cover portion and the base portion.

6. The method of claim 5 wherein said cover portion and said base portion cooperatively define a plurality of corner regions and arranging said filter support configuration at least approximately in one of said corner regions.

7. The method of claim 6 including attaching said resilient arrangement at least at each of said corner regions.

8. The method of claim 5 including using the filter support configuration to define, at least in part, a filter passage for directing air through the recirculation filter.

9. A digital storage apparatus, comprising:
a housing including a cover portion and a base portion, each of said cover portion and said base portion defining a major surface, and a selected one of said cover portion and said base portion including a peripheral sidewall extending outwardly from said major surface thereof to define a peripheral sealing surface that is transverse to the major surface such that attached ones of the cover portion and the base portion cooperate to define a housing interior;
an attachment arrangement for attaching the cover portion to the base portion;
a digital storage arrangement located within said housing interior; and
a sealing arrangement positionable at least partially between said cover portion and said base portion including a sealing configuration for sealing said housing interior at least by engaging said peripheral sealing surface, wherein said sealing arrangement is configured to apply a resilient sealing force against said peripheral sealing surface in a direction that is at least generally parallel to the major surface of the selected one of the cover portion and the base portion.

10. The apparatus of claim 9 wherein said sealing configuration is configured for applying a resilient sealing force against said peripheral sealing surface in a direction that is at least generally normal to the peripheral sealing surface.

11. The apparatus of claim 9 wherein said peripheral sealing surface is at least generally normal to the major surface of the selected one of the cover portion and the base portion.

12. The apparatus of claim 9 wherein said peripheral sealing surface serves to define a portion of said housing interior.

13. The apparatus of claim 9 wherein said peripheral sealing surface confronts said housing interior.

14. The apparatus of claim 9 wherein said attachment arrangement includes a plurality of latching arms as part of the cover portion, which latching arms are movable at least from an unlatched position to a latched position, and the base portion defines a plurality of latching recesses such that the latching arms in said unlatched position are alignable with the latching recesses upon placing the cover portion on the base portion and said latching arms are then movable to the latched position to attach the cover portion onto the base portion.

15. A digital storage apparatus, comprising:
a housing including a cover portion and a base portion, each of said cover portion and said base portion defining a major surface, and a selected one of said cover portion and said base portion including a peripheral sidewall extending outwardly from said major surface thereof to define a peripheral sealing surface that is transverse to the major surface such that attached ones of the cover portion and the base portion cooperate to define a housing interior;
an attachment arrangement for attaching the cover portion to the base portion, wherein said attachment arrangement includes a plurality of latching arms as part of the cover portion, which latching arms are movable at least from an unlatched position to a latched position, and the base portion defines a plurality of latching recesses such that the latching arms in said unlatched position are alignable with the latching recesses upon placing the cover portion on the base portion and said latching arms are then movable to the latched position to attach the cover portion onto the base portion, wherein said cover portion is formed from a sheet material and said latching arms are stamped as an integral portion of said sheet material and said base portion defines the latching recesses;
a digital storage arrangement located within said housing interior; and
a sealing arrangement positionable at least partially between said cover portion and said base portion including a sealing configuration for sealing said housing interior at least by engaging said peripheral sealing surface.

16. In producing a digital storage arrangement, a method comprising:
forming a housing including a cover portion and a base portion, each of said cover portion and said base portion defining a major surface, and a selected one of said cover portion and said base portion including a peripheral sidewall extending outwardly from said major surface thereof to define a peripheral sealing surface that is transverse to the major surface such that attached ones of the cover portion and the base portion cooperate to define a housing interior;
configuring an attachment arrangement for attaching the cover portion to the base portion; locating digital storage means within said housing interior; and
positioning a sealing arrangement at least partially between said cover portion and said base portion including a sealing configuration for sealing said housing interior at least by engaging said peripheral sealing surface, wherein said sealing configuration is configured for applying a resilient sealing force against said peripheral sealing surface in a direction that is at least generally parallel to the major surface of the selected one of the cover portion and the base portion.

17. In producing a digital storage arrangement, a method comprising:
forming a housing including a cover portion and a base portion, each of said cover portion and said base portion defining a major surface, and a selected one of said cover portion and said base portion including a peripheral sidewall extending outwardly from said major surface thereof to define a peripheral sealing surface that is transverse to the major surface such that attached ones of the cover portion and the base portion cooperate to define a housing interior;
configuring an attachment arrangement for attaching the cover portion to the base portion;
forming said attachment arrangement to include a plurality of latching arms as part of the cover portion, which latching arms are movable at least from an unlatched position to a latched position, and the base portion is formed to include a plurality of latching recesses such that the latching arms in said unlatched position are alignable with the latching recesses upon placing the cover portion on the base portion and said latching arms are then movable to the latched position to attach the cover portion onto the base portion, wherein said cover portion is formed from a sheet material and including stamping said latching arms as an integral portion of said sheet material and defining the latching recesses in said base portion; and
locating digital storage means within said housing interior; and positioning a sealing arrangement at least partially between said cover portion and said base portion including a sealing configuration for sealing said housing interior at least by engaging said peripheral sealing surface.

18. The method of claim 17 wherein said sealing configuration is configured for applying a resilient sealing force against said peripheral sealing surface in a direction that is at least generally normal to the peripheral sealing surface.

19. The method of claim 17 wherein said peripheral sealing surface is at least generally normal to the major surface of the selected one of the cover portion and the base portion.

20. The method of claim 17 wherein said peripheral sealing surface defines a portion of said housing interior.

21. The method of claim 17 wherein said peripheral sealing surface confronts said housing interior.

22. The method of claim 16 including forming said attachment arrangement to include a plurality of latching arms as part of the cover portion, which latching arms are movable at least from an unlatched position to a latched position, and the base portion is formed to include a plurality of latching recesses such that the latching arms in said unlatched position are alignable with the latching recesses upon placing the cover portion on the base portion and said latching arms are then movable to the latched position to attach the cover portion onto the base portion.

23. A digital storage apparatus, comprising: a housing including a cover portion for engaging a base portion to define a housing interior; digital storage means located within said housing interior; and a resilient arrangement, which is integrally formed, for resiliently biasing attached ones of the cover portion and base portion away from one another by applying a resilient biasing force in a first direction and for sealing said cover portion to said base portion with said digital storage means in said housing interior by applying a sealing force in a second direction that is transverse to said first direction.

24. The apparatus of claim 23 wherein said second direction is at least approximately normal to said first direction.

25. The apparatus of claim 23 wherein said housing interior defines a major dimension and said resilient biasing force is applied at least approximately normal to said major dimension.

26. The apparatus of claim 23 wherein a selected one of the base portion and the cover portion includes a dependent peripheral sidewall defining a sidewall sealing surface that is terminated by a sidewall distal edge and said resilient biasing force is applied to said distal edge while the sealing force is applied to the sidewall sealing surface.

27. The apparatus of claim 23 wherein said resilient arrangement includes (i) a gasket portion for applying said sealing force to seal the cover portion to the base portion and (ii) a biasing portion for resiliently biasing the cover portion away from the base portion when attached thereto.

28. The apparatus of claim 27 wherein said resilient arrangement is fixedly positioned in the cover portion and the gasket portion is configured for sealingly engaging the base portion.

29. The apparatus of claim 27 wherein said resilient arrangement is molded into position in said cover portion.

30. The apparatus of claim 27 wherein said biasing portion includes a plurality of biasing pedestals which contact one of the base portion and the cover portion to resiliently bias the base and cover portions away from one another in a controlled way.

31. The apparatus of claim 27 wherein said cover portion includes a first major side and said gasket portion is attached at least partially to an inner surface of said first major side.

32. The apparatus of claim 31 wherein said cover portion includes a peripheral sidewall extending transversely from said first major side and said gasket portion is attached at least partially to an inner area of said peripheral sidewall.

33. The apparatus of claim 27 wherein said cover portion includes a first panel defining a first major area and having a periphery and further includes a sidewall extending transversely from said periphery in a way which cooperates with the first panel to define a peripheral corner region and said gasket portion is fixedly disposed, at least in part, in said peripheral corner region.

34. The apparatus of claim 33 wherein said gasket portion is molded into the peripheral corner region.

35. The apparatus of claim 33 wherein said base portion includes a peripheral sealing rim that is configured to engage the gasket portion to seal the digital storage means within said housing.

36. The apparatus of claim 27 wherein said cover portion defines a plurality of through-holes into which said resilient arrangement is molded to serve, at least in part, to positionally retain the gasket portion and the resilient arrangement.

37. The apparatus of claim 36 wherein said cover portion includes a first panel defining a major surface of the cover portion and which defines said through-holes.

38. In producing a digital storage apparatus, a method comprising: forming a housing including a cover portion for engaging a base portion to define a housing interior; locating digital storage means within said housing interior; and configuring a resilient arrangement, which is integrally formed, for resiliently biasing attached ones of the cover portion and base portion away from one another by applying a resilient biasing force in a first direction and for sealing said cover portion to said base portion with said digital storage means in said housing interior by applying a sealing force in a second direction that is transverse to said first direction.

39. The method of claim 38 wherein said second direction is at least approximately normal to said first direction.

40. The method of claim 38 forming produces a major dimension of the housing interior and said resilient biasing force is applied at least approximately normal to said major dimension.

41. The method of claim 38 wherein said forming causes a selected one of the base portion and the cover portion to include a dependent peripheral sidewall defining a sidewall sealing surface that is terminated by a sidewall distal edge and said resilient biasing force is applied to said distal edge while the sealing force is applied to the sidewall sealing surface.

42. The method of claim 38 wherein said resilient arrangement is configured to include (i) a gasket portion for sealing the cover portion to the base portion and (ii) a biasing portion for resiliently biasing the cover portion away from the base portion when attached thereto.

43. The method of claim 42 including fixedly positioning said resilient arrangement in the cover portion such that the gasket portion is configured for sealingly engaging the base portion.

44. The method of claim 42 including molding said resilient arrangement into position in said cover portion.

45. The method of claim 42 wherein said biasing portion is formed to include a plurality of biasing pedestals which contact one of the base portion and the cover portion to resiliently bias the base and cover portions away from one another in a controlled way.

46. The method of claim 42 wherein said cover portion is formed to include a first major side and configuring the resilient arrangement includes attaching said gasket portion at least partially to an inner surface of said first major side.

47. The method of claim 46 wherein said cover portion is formed to include a peripheral sidewall extending transversely from said first major side and attaching said gasket portion at least partially to an inner area of said peripheral sidewall.

48. The method of claim 42 wherein said cover portion is formed to include a first panel defining a first major area and having a periphery and to include a sidewall extending transversely from said periphery in a way which cooperates with the first panel to define a peripheral corner region and including fixedly disposing said gasket portion, at least in part, in said peripheral corner region.

49. The method of claim 48 wherein fixedly disposing includes molding said gasket portion into the peripheral corner region.

50. The method of claim 48 wherein forming the base portion includes arranging a peripheral sealing rim that is configured to engage the gasket portion to seal the digital storage means within said housing.

51. The method of claim 42 wherein said cover portion is formed to define a plurality of through-holes and molding includes forming the resilient arrangement into each through-hole to serve, at least in part, to positionally retain the gasket portion and the resilient arrangement.

* * * * *

UNITED STATES PATENT AND TRADEMARK OFFICE
CERTIFICATE OF CORRECTION

| | | |
|---|---|---|
| PATENT NO. | : 7,312,982 B2 | |
| APPLICATION NO. | : 11/118164 | |
| DATED | : December 25, 2007 | |
| INVENTOR(S) | : Bruner et al. | |

It is certified that error appears in the above-identified patent and that said Letters Patent is hereby corrected as shown below:

<u>Column 24</u>
Line 12, claim 1 after "interior;" a hard return should be implemented, in which Lines 12-13 should read as depicted herein below:

--portion to define a housing interior;
digital storage means located within said housing interior;--

Line 38, claim 4 change "part" to --in part--

<u>Column 26</u>
Line 27, claim 16 after "base portion;" a hard return should be implemented, in which Lines 27-28 should read as depicted herein below:

--cover portion to the base portion;
locating digital storage means within said housing interior; and--

Line 64, claim 16 delete "and"
Line 66, claim 16 after "and" a hard return should be implemented, in which Lines 66-67 should read as depicted herein below:

--rior; and
positioning a sealing arrangement at least partially between said cover portion and said base--

UNITED STATES PATENT AND TRADEMARK OFFICE
CERTIFICATE OF CORRECTION

PATENT NO. : 7,312,982 B2
APPLICATION NO. : 11/118164
DATED : December 25, 2007
INVENTOR(S) : Bruner et al.

It is certified that error appears in the above-identified patent and that said Letters Patent is hereby corrected as shown below:

<u>Column 28</u>
Line 43, claim 40 change "forming" to --wherein said forming--

Signed and Sealed this

Eighth Day of December, 2009

David J. Kappos
*Director of the United States Patent and Trademark Office*